(12) United States Patent
Rajasekaran

(10) Patent No.: US 10,631,076 B2
(45) Date of Patent: *Apr. 21, 2020

(54) COMMUNICATION HUB AND COMMUNICATION SYSTEM

(71) Applicant: Plantronics, Inc., Santa Cruz, CA (US)

(72) Inventor: Arun Rajasekaran, Saratoga, CA (US)

(73) Assignee: Plantronics, Inc., Santa Cruz, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/388,748

(22) Filed: Apr. 18, 2019

(65) Prior Publication Data

US 2019/0246195 A1 Aug. 8, 2019

Related U.S. Application Data

(63) Continuation of application No. 15/684,663, filed on Aug. 23, 2017, now Pat. No. 10,405,080, which is a continuation-in-part of application No. 15/457,236, filed on Mar. 13, 2017, now Pat. No. 10,063,959.

(51) Int. Cl.
  *H04R 1/10* (2006.01)
  *G06F 3/16* (2006.01)
  *H04R 3/12* (2006.01)

(52) U.S. Cl.
  CPC .......... *H04R 1/1041* (2013.01); *G06F 3/162* (2013.01); *G06F 3/165* (2013.01); *H04R 3/12* (2013.01); *H04R 2201/107* (2013.01); *H04R 2420/07* (2013.01)

(58) Field of Classification Search
  CPC ... H04R 1/1041; H04R 2420/07; G06F 3/162; G01H 3/14; H03G 3/001; H03G 11/008

USPC .................. 381/74, 103, 123, 56; 709/217; 455/355; 379/590.01
  See application file for complete search history.

(56) References Cited

U.S. PATENT DOCUMENTS

| | | | |
|---|---|---|---|
| 6,826,515 | B2 | 11/2004 | Bernardi et al. |
| 7,013,011 | B1 | 3/2006 | Weeks et al. |
| 7,200,238 | B1 | 4/2007 | Shyu et al. |
| 8,369,535 | B1 | 2/2013 | Shyu et al. |
| 8,391,503 | B2 | 3/2013 | Bayley et al. |
| 8,983,081 | B2 | 3/2015 | Bayley et al. |
| 9,980,028 | B2 | 5/2018 | McNeill et al. |
| 2003/0002688 | A1* | 1/2003 | Kanevsky ............ H04R 3/00 381/74 |

(Continued)

OTHER PUBLICATIONS

Unknown, "Acoustic Safety for Telephone Equipment," Industry Guideline ACIF G616:2006, Jan. 2006, 30 pages.

(Continued)

*Primary Examiner* — Melur Ramakrishnaiah
(74) *Attorney, Agent, or Firm* — Thomas S. Dienwiebel; Slayden Grubert Beard, PLLC

(57) ABSTRACT

A communication hub for a communication system and a communication system are provided. The communication hub comprises at least an audio I/O interface for connection with one or more audio sources to at least receive an input audio signal, a user device interface for connection with at least one user audio device, a processor to provide a user input audio signal to the user device interface from the input audio signal, and a reporting module, configured to generate metadata of at least the input audio signal and to provide the metadata to a monitoring device of the communication system.

20 Claims, 13 Drawing Sheets

(56) References Cited

U.S. PATENT DOCUMENTS

| | | | |
|---|---|---|---|
| 2006/0147049 A1 | 7/2006 | Bayley et al. | |
| 2006/0222185 A1* | 10/2006 | Dyer | H04R 29/001 |
| | | | 381/74 |
| 2007/0024700 A1 | 2/2007 | Lim et al. | |
| 2008/0130906 A1 | 6/2008 | Goldstein et al. | |
| 2008/0159547 A1 | 7/2008 | Schuler et al. | |
| 2008/0253583 A1 | 10/2008 | Goldstein et al. | |
| 2011/0222710 A1 | 9/2011 | Biswas et al. | |
| 2013/0101125 A1 | 4/2013 | Peters et al. | |
| 2014/0161264 A1 | 6/2014 | Kirkbak et al. | |
| 2015/0065055 A1 | 3/2015 | Newham et al. | |
| 2017/0374444 A1* | 12/2017 | McNeill | H04R 1/1083 |

OTHER PUBLICATIONS

International Search Report and Written Opinion dated May 11, 2018 for PCT Application No. PCT/US2018/020782 (9 pages).
International Search Report and Written Opinion dated Apr. 12, 2018 for PCT Application No. PCT/US0218/020781 (7 pages).
European Examination Report for EP Application No. 18767067.4, dated Sep. 2, 2019 (6 pages).
European Search Report for EP Application No. 18767067.4, dated Aug. 6, 2019 (4 pages).

* cited by examiner

US 10,631,076 B2

COMMUNICATION HUB AND COMMUNICATION SYSTEM

CROSS-REFERENCE TO RELATED APPLICATIONS

The present application is a continuation application of U.S. patent application Ser. No. 15/684,663, filed Aug. 23, 2017, and titled "Communication Hub and Communication System," which is a continuation-in-part application claiming the benefit of U.S. patent application Ser. No. 15/457, 236, filed Mar. 13, 2017, and titled "Headset System and Headset." The contents of the aforesaid applications are incorporated herein by reference in their entireties.

TECHNICAL FIELD

The present invention relates to the field of acoustic safety and in to particular acoustic safety for user audio devices, such as headsets.

BACKGROUND

Acoustic safety of users of user audio devices, such as headsets, is gaining attention in recent years due to the rising use of such devices, e.g., for telecommunications applications and consuming audio, as well as due to an increase in hearing-related health issues.

In view of the above, official guidelines for workplace safety in various countries provide maximum sound pressure levels for workplace environments, which should not be exceeded. Accordingly, some types of modern telecom office equipment, such as phones and headsets allow for safety monitoring and/or control to assure that the output audio stays below the recommended maximum levels.

However, not all of such devices being sold today have corresponding capabilities. In addition, older equipment is in use, which does allow safety monitoring or control.

In view of the severe consequences of damage to the hearing of a user, an object exists to improve the acoustic safety for users using audio devices, and in particular headsets.

SUMMARY

The following summary of the present invention is provided to facilitate an understanding of some of the innovative features unique to the present invention and is not intended to be a full description. A full appreciation of the various aspects of the invention can be gained by taking the entire specification, claims, drawings, and abstract as a whole.

According to one aspect of the present invention, a communication hub for a communication system is provided. The communication hub comprises at least an audio I/O interface for connection with one or more audio sources to at least receive an input audio signal, a user device interface for connection with at least one user audio device, a processor to provide a user input audio signal to the user device interface from the input audio signal, and a reporting module, configured to generate metadata of at least the input audio signal and to provide the metadata to a monitoring device of the communication system.

A basic idea of the above aspect of the invention is to provide an intermediate device, connectable between an audio source and a user audio device, which allows to generate metadata of the audio and to send the generated metadata to a further device, for example a central monitoring device or server for further processing.

Accordingly, the hub may enable a user to use a prior art user audio device, such as a headset, in a communication system with a monitoring device. Also, the hub may enable a user to use a prior art audio source, such as a "non-smart" desk phone, in such communication system. The monitoring device in an embodiment uses the metadata to determine acoustic safety incidents, however, the present invention is not limited thereto.

These aspects and other aspects of the invention will be apparent from and elucidated with reference to the embodiments described hereinafter.

DETAILED DESCRIPTION OF PREFERRED EMBODIMENTS

Figure 1:
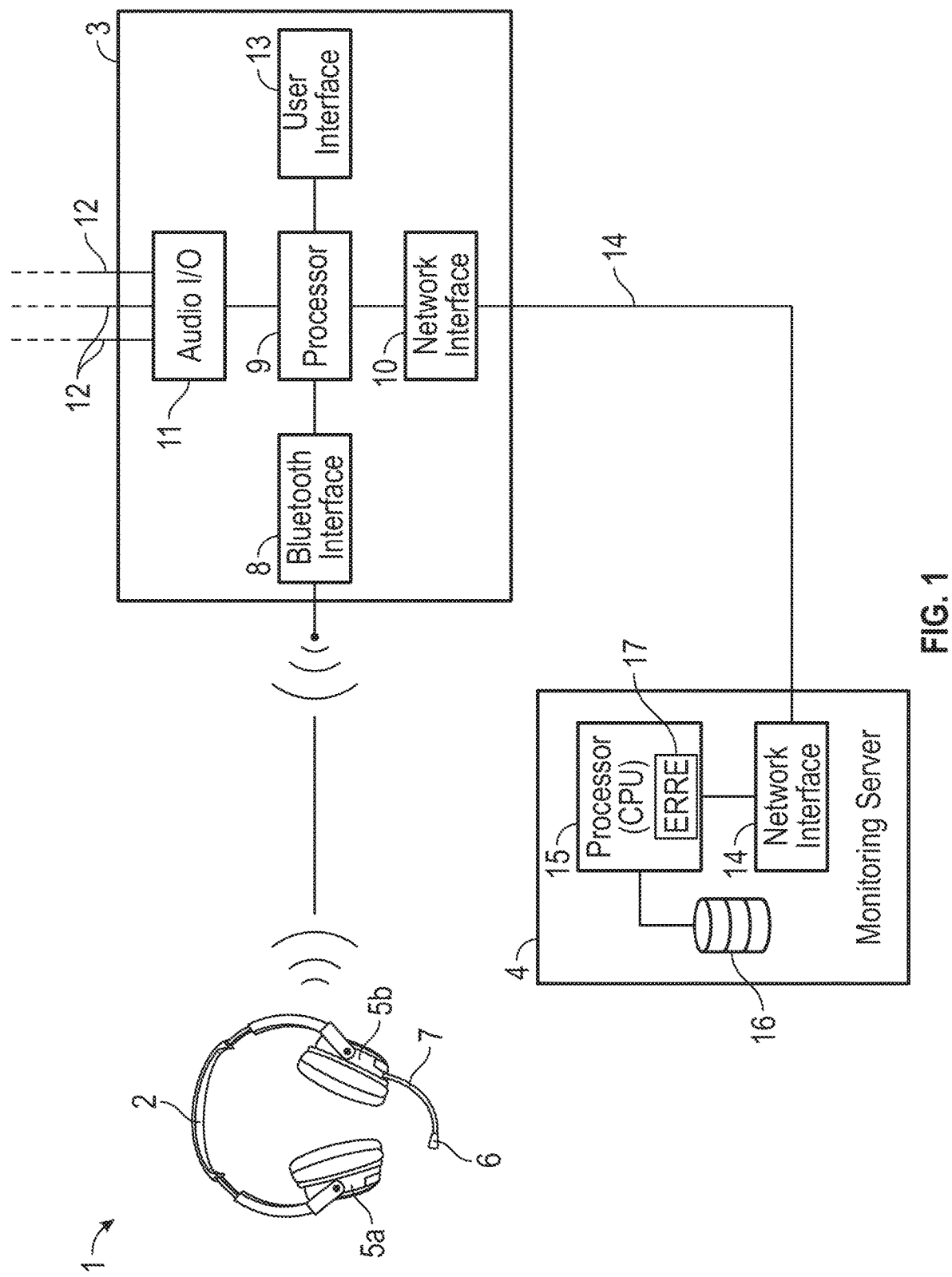
FIG. 1 shows a first embodiment of a headset system with a headset, a communication hub, and a monitoring server in a schematic block diagram.

Technical features described in this application can be used to construct various embodiments of communication hubs, communication systems, and methods of audio processing according to the preceding and following description. Some embodiments of the invention are discussed so as to enable one skilled in the art to make and use the invention.

In the following explanation of the present invention according to the embodiments described, the terms "connected to" or "connected with" are used to indicate a data and/or audio connection between at least two components, devices, units, or modules. Such a connection may be direct between the respective components, devices, units, or modules; or indirect, i.e., over intermediate components, devices, units, or modules. The connection may be permanent or temporary; wireless or conductor based.

For example, a data and/or audio connection may be provided over a WAN (wide area network), LAN (local area network), PAN (personal area network), BAN (body area network) comprising, e.g., the Internet, Ethernet networks, cellular networks, such as LTE, Bluetooth (classic, smart, or low energy) networks, DECT networks, ZigBee networks, and/or Wi-Fi networks using a corresponding suitable communications protocol. In some embodiments, a USB connection, a Bluetooth network connection and/or a DECT connection is used to transmit audio and/or data.

In the present context, the term "communication system" may comprise networks, systems, and devices for communication purposes, such as a mobile phone, a soft-phone system, a desk phone that terminates a telephone (PSTN) network or a VOIP network, and combinations thereof.

In the present explanation, a user audio device is understood as a device that provides at least audio playback to the user. For example, the user audio device may be a headphone or a loudspeaker. In corresponding embodiments, the user audio device may also be configured to record audio, in addition to providing audio playback to the user. In these cases, the user audio device may be a combination of a headphone or speaker with at least one microphone.

In the context of this application, the term "headset" refers to all types of headsets, headphones, and other head worn audio playback devices, such as for example circumaural and supra aural headphones, ear buds, in ear headphones, and other types of earphones. The headset may be of mono, stereo, or multichannel setup. A microphone may or may not be provided as part of a headset in the context of this explanation. The headset in an embodiment may comprise an audio processor. The audio processor may be of any suitable type to provide output audio from an input audio signal. For example, the audio processor may be a digital sound processor (DSP).

The headset in further embodiments certainly may comprise additional components. For example, the headset in one exemplary embodiment may comprise one or more of a microphone to obtain user audio from the user, additional control electronics to process audio, a wireless communications interface, a central processing unit, and a battery.

The terms "audio signal" and "audio stream" in the present context refer to an analogue or digital representation of audio. For example, the audio signals described herein may be of pulse code modulated (PCM) type, or any other type of bit stream signal. Each audio signal may comprise one channel (mono signal), two channels (stereo signal), or more than two channels (multichannel signal). The audio signal may be compressed or not compressed.

According to one exemplary aspect of the present invention, a communication(s) hub for a communication system is provided. The communication hub comprises at least an audio I/O interface for connection with one or more audio sources to at least receive at least one input audio signal. The communication hub further comprises a user device interface for connection with at least one user audio device and a processor to provide a user input audio signal to the user device interface from the input audio signal. The communication hub further comprises a reporting module, configured to generate metadata of at least the input audio signal and to provide the metadata to a monitoring device of the communication system.

According to the preceding, the communication hub comprises an audio I/O interface for connection with one or more audio sources and a user device interface for connection with at least one user audio device. The audio I/O interface may be of any suitable type and may be adapted to use one or more of the audio connections, discussed in the preceding, such as one or more of USB, Bluetooth, or DECT audio connections, or any other suitable digital or analog audio connection.

As will be apparent from this setup, the communication hub thus forms an "intermediate" or interposed device between a source of audio and a corresponding receiver, such as the user audio device.

The communication hub comprises the processor to provide a user input audio signal to the user device interface from the input audio signal. The processor thus is connected at least temporarily with the audio I/O interface and the user device interface. The user input audio signal, when provided to the at least one user audio device, causes the latter to provide a corresponding audio playback to the user. Certainly, this assumes that the respectively used user audio device is connected to the user device interface.

The processor in one embodiment is a DSP, i.e., a digital signal processor, adapted to process the input audio signal. For example, the processing may comprise volume change, data format change, limiter functionality, and/or compressor functionality.

Both, the audio I/O interface and the user device interface, are configured for connection with the respective external devices, i.e., the one or more audio sources and the at least one user audio device, respectively. Such connection may be temporary or permanent. For example and in case of a temporary connection, the respective interface may comprise suitable sockets for a detachable connection with corresponding plugs.

The communication hub according this aspect further comprises the reporting module, configured to generate metadata of at least the input audio signal and to provide the metadata to the monitoring device.

The metadata is provided to the monitoring device over a suitable data connection. This data connection may be of permanent type to allow a continuous transmission of the metadata to the monitoring device or of temporary type. In the latter case, metadata in an embodiment is temporarily stored in the communication hub, e.g., in a suitable memory device of the communication hub and/or the reporting module, and then transmitted in regular or irregular intervals to the monitoring device. In one embodiment, the reporting module also generates metadata of a user output audio signal, such as acquired from one or more microphones of a headset and as discussed in further detail in the following.

In the present context, the term "metadata" refers to data about at least the input audio signal. In one embodiment, the metadata comprises at least information relating to the sound pressure level that would be produced by the user audio device when the signal is applied to it unaltered. In another additional embodiment, the metadata comprises information relating to sound pressure level over frequency and/or time. In another additional or alternative embodiment, the metadata comprises information relating to whether the sound pressure level exceeded one or more predefined threshold levels. In another additional or alternative embodiment, call-control events of the communication system are comprised in the metadata, such as on-hook, off-hook, mute and/or device events, e.g., key-presses, don/doff state, or other call-control or device events.

The reporting module in one embodiment may be configured to determine the sound pressure level from analyzing the input audio signal together with settings of the communication hub, such as amplifier settings. In another embodiment, the reporting module is connected to a microphone that is arranged to monitor the actual sound pressure level produced by the user audio device during operation. In this case certainly, the reporting module would more precisely generate metadata of the user input audio signal, i.e., the processed signal.

It is noted that the term "module" as used herein may refer to a collection of routines, functions, and/or data structures that perform a particular task or implements a particular abstract data type. Modules may be composed of two parts: 1) an interface that lists the constants, data types, variables, and routines/functions that can be accessed by other modules, devices, or routines/functions and 2) an implementation that is typically private, accessible only to that module, and includes source code that actually implements the routines/functions in the module. The term "module" may also simply refer to an application, such as a computer program, to assist in the performance of a specific task. In other examples, at least part of the module may be implemented by hard-wired logic, hardware, or other circuitry.

In one embodiment, the reporting module is formed integrally with the processor of the communication hub. In another embodiment, the reporting module is formed in another (central) processing device of the communication hub.

According to the present aspect, the metadata is sent to the monitoring device. The monitoring device may be of any suitable type of computing device to provide the functionality described. The monitoring device may be co-located with the communication hub or located at a remote and/or central facility in corresponding embodiments. In one embodiment, the monitoring device is a monitoring server, which is understood to include cloud-based monitoring services. Certainly, the server may provide additional functions in additional embodiments, such as directory and/or configuration functions.

In one embodiment, the communication hub comprises a network interface for connection with the monitoring device. The network interface may be of any suitable type to connect to the monitoring device using a wireless or conductor-based data connection, such as wired or wireless WAN or LAN connectivity technology. In another embodiment, the communication hub connects to the monitoring device over an intermediate device, such as a connected computer or smart phone. In this embodiment, the communication hub may use the data connection of the connected intermediate device for connection to the monitoring device.

In another embodiment, the one or more audio sources comprise "communication sources" or devices, such as a phone, e.g., a PSTN (desk) phone, a mobile phone, but also a direct connection to a PSTN line, a VOIP line or interface, and a computer with suitable communication software. It is noted that in one embodiment, a corresponding communication source, connected with the audio I/O interface, may be formed in the communication hub. For example, a softphone client could be provided as programming for execution by the processor.

As discussed in the preceding, the user audio device may be a headset. Correspondingly and in one embodiment, the user device interface may be configured for connection with such headset. The connection may be conductor-based, e.g., using a suitable detachable plug and socket connection, or wireless, for example using the Bluetooth or DECT wireless communication standards. Certainly and in another embodiment, the user device interface may be configured for both, conductor-based and wireless connections with the user audio device. In another embodiment, the user device interface is configured for connection to a plurality of user audio devices. The user device interface in this embodiment may be configured for simultaneous connection to a plurality of user audio devices or may be configured with a switchable connection. In case of a switchable connection, only one of the plurality of user audio devices is connected with the user device interface at a time. The communication hub in a further embodiment may comprise a user interface in the hub or on a connected computing device that allows the user to select the user audio device.

In another embodiment, the audio I/O interface is configured for connection with a plurality of audio sources. The connection to the plurality of audio sources in this embodiment may be simultaneous or switchable.

In case of a switchable connection, only one of the plurality of input audio signals of the plurality of audio sources is provided to the user device interface at a time. The communication hub in a further embodiment may comprise a user interface in the hub or on a connected computing device that allows the user to select the audio source. Alternatively or additionally, the processor of the hub may be configured to automatically select the audio source that is "forwarded", e.g., by analyzing whether the audio source is currently active. In case of a simultaneous connection and in another embodiment, the processor mixes the plurality of input audio signals into a single user input audio signal.

In both instances, the reporting module generates metadata of at least one input audio signal. In a further embodiment, the reporting module generates metadata of all input signals. In another embodiment, the reporting module generates metadata of the user input audio signal.

In another alternative or additional embodiment, the processor is configured to receive a user output signal from the user device interface and to provide a corresponding output audio signal to the audio I/O interface. In the present embodiment, the communication hub thus is configured for "two-way communication". The corresponding signal may be provided to an audio source, which then certainly also acts as an "audio receiver". The receiving audio source may be the same than the audio source, providing a current input audio signal, or a different audio source, depending on system configuration.

In another embodiment, the reporting module is configured to generate metadata of both, the input audio signal and the output audio signal.

In one embodiment, the monitoring device is configured to determine, whether an acoustic safety incident is given. The monitoring device may in an additional embodiment use the metadata obtained from the connected communication hub, or in case of the communication system having multiple communication hubs, use the metadata of a plurality of communications hubs for the determination of whether an acoustic safety incident is given.

In the present context, the term "acoustic safety incident" may refer to an event that caused acoustic shock and/or that exceeded one or more predefined audio safety thresholds, such as those defined in ACIF G616:2006—Acoustic safety for telephone equipment. Further examples are discussed in the following, in particular with reference to the discussion of the FIGS. and the shown embodiments. It is noted that depending on the respective example, the determination of an acoustic safety incident does not necessarily mean direct damage to the user's hearing. A predefined audio safety threshold may in some embodiments be defined so that a safe level is not exceeded, i.e., lower than a level that would provide direct damage.

The determination of the monitoring device, whether an acoustic safety incident is given at one or more of the communication hubs allows to take an appropriate action, depending on the respective application.

In one embodiment, the monitoring device is configured to provide a safety notification in case an acoustic safety incident is determined. The safety notification may be of any suitable type, for example a corresponding electronic message, such as an instant message or e-mail. In an embodiment, the safety notification is provided to the user of the communication hub, where the acoustic safety incident originated. In another embodiment, the safety notification is provided to a safety officer of the respective organization where the communication hub is used. In another embodiment, the safety notification is provided to a database system to update a safety database. Certainly, it is in corresponding embodiments possible that the safety notification is provided to multiple recipients, such as the above.

In another embodiment, the communication hub additionally comprises a mode-switchable acoustic safety module, which is configured to process the input audio signal to obtain the user input audio signal and to reduce acoustic shocks to the hearing of the respective user of the communication hub during operation, i.e., when the user is using the user audio device, for example by wearing a headset, connected to the communication hub. The term "mode-switchable" in this context denotes that the acoustic safety module can be switched at least from an un-operational mode (OFF or disabled mode) to an operational mode (ON or enabled mode) and vice versa. Certainly, the mode-switchable acoustic safety module in corresponding embodiments may be configured with more than the two above, i.e., ON and OFF modes.

The discussed reduction of acoustic shocks is provided in the operational mode(s), although it is noted that a basic reduction of acoustic shocks may be provided even in the un-operational mode in a corresponding embodiment, for example using an acoustic limiting integrated chip (ALIC). In this case, the operational mode provides improved reduction of acoustic shocks. In one embodiment, the ALIC provides a reduction of acoustic shocks for sound levels above 118 dB SPL (using, e.g., a "limiter function") even in the un-operational mode, while the mode-switchable acoustic safety module provides a reduction of acoustic shocks for sound levels above 98 dB SPL in the operational mode. With regard to the reduction of acoustic shock, reference is made to U.S. patent publication US 2006/0147049 A1, "SOUND PRESSURE LEVEL LIMITER WITH ANTI-STARTLE FEATURE", published on Jul. 6, 2006, which is incorporated herein in its entirety.

In the context of the present invention, the term "acoustic shock" is understood as an event that results in damage to the user's hearing and that is caused by audio, provided from the respective audio signal. The damage can be direct, i.e., short-term damage, or indirect, i.e., long-term damage to the user's hearing. An acoustic shock may in general be influenced by the loudness or sound pressure level of the received sound, the suddenness of an increase in sound pressure level, the duration of the increase in sound pressure level, the frequency/frequencies of the sound, the background noise level in the user's vicinity, and or the nature and unexpectedness of the sound.

To provide a reduction of acoustic shock and in an embodiment, the mode-switchable acoustic safety module comprises at least one of an audio limiter, an audio compressor, and an audio "dosage" limiter to reduce the sound pressure level of the output audio to safe levels. For example, the mode-switchable acoustic safety module may comprise a sound pressure level limiter, as disclosed in US 2006/0147049 A1, discussed in the preceding. The mentioned audio dosage limiter provides limited overall audio exposure during a given time, such as a user's workday.

According to an embodiment, the reporting module is configured to generate metadata of the audio signal(s) in case the acoustic safety module is in the enabled or in the disabled state. According to another embodiment, the reporting module is configured to generate metadata of the audio signal(s) in all operational states of the acoustic safety module, i.e., independent of the state of the acoustic safety module.

According to a further additional or alternative embodiment, the monitoring device is configured to enable the mode-switchable acoustic safety module of at least one of the one or more communication hubs in case an acoustic safety incident is determined. The resulting automatic operation of the monitoring device allows a particularly quick reaction to acoustic safety incidents and thus to avoid future incidents in case an acoustic safety incident is determined. Certainly, the safety notification, as discussed in the preceding, may in a corresponding embodiment also be provided in case of an automatic enabling of the mode-switchable acoustic safety module to provide awareness of the incident and/or the fact that the acoustic safety module was enabled automatically.

In one embodiment, the monitoring device enables the mode-switchable acoustic safety module by providing a corresponding control signal or control command to the respective processor. Correspondingly in this embodiment, the monitoring device is at least temporarily connected with the processor and the mode-switchable acoustic safety module, respectively.

According to another embodiment, the monitoring device is configured to disable the acoustic safety module in case no acoustic safety incident is determined for a predefined time period or timeout. For example, the monitoring device may be configured with a predefined time period of several seconds for corresponding audio limiter functions and several minutes for audio dosage functions. The automatic disabling according to the present embodiment may improve the sound quality of the output audio or the battery life of a battery-powered communication hub.

According to a further embodiment, the monitoring device is configured to determine, whether an acoustic safety incident is given by comparing the metadata of an audio signal of at least a first of one or more communication hubs with at least one predefined audio safety threshold.

As already discussed in the preceding, the monitoring device may for example be configured with one or more of the parameters, defined in ACIF G616:2006 as predefined audio safety thresholds. In further embodiments, the monitoring device may alternatively or additionally be configured with one or more of a time-weighted average sound pressure threshold level, maximum sound pressure level, maximum sound intensity, maximum duration, maximum rate of change, frequency, duration of the expected work day of the user, minimum reporting level (gain threshold) of predefined sound pressure levels and minimum reporting duration (duration threshold) of predefined sound pressure levels.

Certainly, and in a corresponding embodiment, the monitoring device may be configured to determine an acoustic safety incident from the metadata of multiple or all communication hubs of the communication system instead from the metadata of a single communication hub.

In a further embodiment, the monitoring device is configured to enable the mode-switchable acoustic safety module of at least the first communication hub, i.e., the communication hub, where the acoustic safety incident occurred. The current "device-based" enabling or activation of the acoustic safety module provides a local control approach, where the mode-switchable acoustic safety module is only enabled, when necessary in view of a given acoustic safety incident at the respective communication hub. Certainly, it is possible in a corresponding embodiment that the acoustic safety module of one or more additional communication hubs are enabled. For example, in case a multitude of communication hubs are used in a call-center environment, the acoustic safety modules of all communication hubs of the sales team, i.e., a subgroup, may be enabled in case an acoustic safety incident was determined at one of the communication hubs of the sales team.

Alternative to the preceding embodiment and in another embodiment, the monitoring device is configured to enable the mode-switchable acoustic safety modules of all of the one or more communication hubs when an acoustic safety incident occurred. The present "group-based" approach provides a higher level of prevention of acoustic shocks for all users of the communication system.

According to a further embodiment, the monitoring device comprises a machine learning module. The machine learning module in this embodiment receives the metadata from the reporting module(s) of the one or more communication hubs to determine an acoustic safety probability parameter. The monitoring device is configured to enable the mode-switchable acoustic safety module of at least one of the one or more communication hubs in case an acoustic safety likelihood probability parameter corresponds to a safety incident probability threshold.

The present embodiment is based upon the recognition of the inventor that in addition to monitor for past acoustic safety incidents, it may be beneficial to also determine, whether the occurrence of an acoustic safety incident is likely in the future. It is noted that in the present embodiment, the determination of the acoustic safety probability parameter is conduced parallel to the determination of an acoustic safety incident, as discussed in the preceding.

The machine learning module accordingly receives the metadata of the one or more communication hubs and evaluates the metadata. In one embodiment, the machine learning module comprises an artificial neural network, which uses the metadata as training data. The acoustic safety probability parameter and the safety incident probability threshold may be of any suitable type. In one example, both, the parameter and threshold are percentage values. In this embodiment, the case that the acoustic safety probability parameter "corresponds" to the safety incident probability threshold comprises that the acoustic safety probability parameter is equal to and being higher than the incident probability threshold.

The safety incident probability threshold in one embodiment is predefined, such as by the manufacturer or the operator of the communication hub. Certainly, and in another embodiment, it is conceivable that the safety incident probability threshold is user configurable, e.g., for the communication system and all hubs thereof, for groups of hubs, or individually for a single hub.

According to a further embodiment, the machine learning module is additionally configured to receive communications metadata and to determine an acoustic safety probability parameter from the metadata of the audio signal(s) and the communications metadata. The present embodiment may improve the determination of the likelihood of a future incident further.

In the present context, the "communications metadata" may comprise metadata related to call-control events, device events, and audio of the communication system. The communications metadata may originate from a mobile phone system, a soft-phone system, a desk phone system that terminates a telephone (PSTN) network or a VOIP network, and combinations thereof. For example, metadata generated by a headset device connected to the PSTN network may comprise information of nearby static events, such as lightning incidents, which may cause acoustic safety incidents.

The machine learning module might also be given access to additional data from a soft-phone application, mobile-phone application, a hard-phone network, and/or a telephony network (traffic and quality of service). These datasets when combined with some or all other metadata from the communication system may improve the enablement or disablement decision of the acoustic safety module.

According to another embodiment, the monitoring device is additionally configured to disable the mode-switchable acoustic safety module of at least one of the one or more communication hubs in case the acoustic safety probability parameter does not correspond to the safety incident probability threshold. In the above example of percentage probability values, the monitoring device accordingly disables the acoustic safety module when the acoustic safety probability parameter is lower than the safety incident probability threshold.

The preceding embodiment of an automatic disabling of the acoustic safety module in case the incident probability, i.e., the probability of an acoustic safety incident in the future, e.g., in the near future, may be combined with the also preceding embodiment, in which the acoustic safety module is disabled, when no acoustic safety incident is determined for a predefined time interval or period.

In an embodiment, both conditions have to be fulfilled. Accordingly, and in a further embodiment, the monitoring device is additionally configured to disable to the mode-switchable acoustic safety module of at least one of the one or more communication hubs in case the acoustic safety probability parameter does not correspond to the safety incident probability threshold and no acoustic safety incident is determined for a predefined time period.

In a further embodiment, the communication system comprises one or more audio sources, connected to at least one of the one or more communication hubs to provide at least one input audio signal, wherein the one or more audio sources are formed separate from the monitoring device. The present example of a separate, e.g., spaced or remote, arrangement of the monitoring device from the audio source allows to keep the audio sources and the corresponding signals local in the vicinity of the respective communication hubs, while it is possible to provide the monitoring device, e.g., in a remote facility. The one or more audio sources may be of any suitable type, for example a desk phone, a mobile phone, a computer, a tablet.

According to a further exemplary aspect, a headset system is provided having at least a monitoring device and one or more headsets. The monitoring device is connected with the one or more headsets over a suitable connection. The one or more headsets each comprise an audio processor to provide output audio from an input signal. The audio processor comprises a mode-switchable acoustic safety module with at least an enabled state and a disabled state and being configured to at least when enabled process the input audio to reduce acoustic shocks. The one or more headsets are each associated with a reporting module, configured to generate metadata of the output audio. The monitoring device is configured to receive the metadata from the one or more headsets and to determine, whether an acoustic safety incident is given.

Each headset according to the present aspect is associated with a reporting module. The reporting module may in an embodiment be formed integrally with the headset, or in another embodiment may be formed separate from the headset, such as in a corresponding connection device, a communication hub, or in a base station in case of a wireless headset. In another embodiment, the reporting module is formed integrally with the audio processor of the headset. In another embodiment, the reporting module is formed in a central processor of the headset.

The headset system and in particular the one or more headsets and the monitoring device according to the present aspect and in further embodiments may be configured according to one or more of the embodiments, discussed in the preceding with reference to the preceding aspect. With respect to the terms used for the description of the present aspect and their definitions, reference is made to the discussion of the preceding aspect.

According to another exemplary aspect, a headset system with at least one or more headsets to provide output audio and a monitoring device, connected with the one or more headsets, is provided. According to the present aspect, the one or more headsets each comprise an audio processor to provide the output audio to a respective user from an input audio signal and a mode-switchable acoustic safety module with at least an enabled state and a disabled state and in the enabled state being configured to process the input audio signal to reduce acoustic shocks. The monitoring device is configured to determine whether an acoustic safety incident is likely and in this case to enable the acoustic safety module.

The present aspect allows a reduction of acoustic shocks by enabling the acoustic safety module when an acoustic safety incident is likely. In one example, the monitoring device comprises a machine learning module, which machine learning module is configured to receive metadata and to determine whether an acoustic safety incident is likely from the metadata. The metadata may in one embodiment comprise communications metadata. In another alternative or additional embodiment, the metadata comprises metadata of the output audio, e.g., obtained from a reporting module of the one or more headsets.

The headset system and in particular the one or more headsets and the monitoring device according to the present aspect and in further embodiments may be configured according to one or more of the embodiments, discussed in the preceding with reference to the preceding aspects. With respect to the terms used for the description of the present aspect and their definitions, reference is made to the discussion of the preceding aspects.

According to a further exemplary aspect, a headset for a headset system is provided with at least an audio processor to provide the output audio to a respective user from an input audio signal and a reporting module, configured to generate metadata of the output audio and to provide the metadata to a monitoring device of the headset system.

In one embodiment, the audio processor of the headset system comprises a mode-switchable acoustic safety module with at least an enabled state and a disabled state and in the enabled state being configured to process the input audio signal to reduce acoustic shocks.

In another embodiment, the mode-switchable acoustic safety module is configured to be enabled and disabled by the monitoring device of the headset system.

The headset according to the present aspect and in further embodiments may be configured according to one or more of the embodiments, discussed in the preceding with reference to the preceding aspects. With respect to the terms used for the description of the present aspect and their definitions, reference is made to the discussion of the preceding aspects.

According to a further exemplary aspect, a computer-implemented method of reducing acoustic shock in a headset system with one or more headsets to provide output audio and a monitoring device, connected with the one or more headsets is provided. In the present method, the monitoring device receives metadata of the output audio from the one or more headsets and determines, using the metadata, whether an acoustic safety incident is given.

The headset system according to the present aspect and in further embodiments may be configured according to one or more of the embodiments, discussed in the preceding with reference to the preceding aspects. With respect to the terms used for the description of the present aspect and their definitions, reference is made to the discussion of the preceding aspects.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate figures. It is further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

FIG. 1 shows a first embodiment of a headset system 1 in a schematic block diagram, also referred to more broadly as a communication system in the following. The headset system 1 comprises a headset 2, a headset or "communication(s)" hub 3, and a monitoring server 4. Headset 2 comprises two headphones 5a, 5b, and a microphone 6, mounted on boom 7. Headset 2 is configured to communicate wirelessly using the Bluetooth protocol with communication hub 3 and thus further comprises a Bluetooth interface 22 (not shown in FIG. 1). Hub 3 comprises a corresponding a user device interface, which in this embodiment is a Bluetooth interface 8, a processor 9, a network interface 10, and an audio input/output (I/O) interface 11, the latter of which is connectable to one or multiple audio sources (not shown) over audio connections 12. The audio sources may comprise "communication sources" or devices, such as a phone, e.g., a PSTN (desk) phone, a mobile phone, but also a direct connection to a PSTN line, a VOIP line or interface, and a computer with suitable communication software. The audio connections 12 to the communication sources may for example be provided as USB, Bluetooth (low energy), DECT, Wi-Fi, LAN, or analog connections. It is noted that Bluetooth interface 8 may provide connections to multiple headsets 2 simultaneously to allow conference calls.

The communication hub 3 of this embodiment provides multiple functionalities. First, hub 3 and in particular processor 9 is adapted to process an input audio signal, applied to audio I/O interface 11, and to provide a processed user input audio signal to the headset 2. The user input audio signal is then provided to a user using headphones 5a, 5b of headset 2 as output audio. It is noted that in the present context, the output audio is provided to the user during operation, i.e., when the respective user is wearing the headset 2. A user output audio signal, recorded by microphone 6 is transmitted to communication hub 3 and then provided to audio I/O interface 11 as output audio signal for delivery to an audio source. It will be apparent that certainly, the audio source in this embodiment also serves as audio receiver for the user audio.

In addition to the above, hub 3 also allows to control the headset 2, e.g., using user interface 13. The user interface 13 provides typical functions, including volume adjustment, muting, and selection of the active audio source. The headset 2 comprises a further user interface, which duplicates some of the aforesaid functions, but also allows to switch the headset 2 on or off. User interface 13 of the hub 3 also allows to enable and disable a mode-switchable acoustic safety module 20 (not shown in FIG. 1, cf. FIG. 2) of the headset 2, which acoustic safety module 20 is provided to reduce events of acoustic shock to the user during operation. Details of the operation of acoustic safety module 20 will be discussed in more detail in the following, in particular with reference to FIG. 2. In case of multiple headsets 2, the corresponding headsets 2 may be of identical type or may differ from each other. In any case, the above functionality is given for each headset 2.

The communication hub 3 furthermore comprises a network interface 10, which connects hub 3 to monitoring server 4. The connection 14 in this embodiment is an encrypted TCP/IP connection. Monitoring server 4 comprises a corresponding network interface 14 and a CPU 15. Memory unit 16 comprises programming that provides, upon execution by CPU 15, the functionality of an event reporting rules engine (ERRE) 17.

During use of the headset 2, metadata of the output audio, as provided to the user at headphones 5a, 5b is provided to the headphone hub 3 and consequently to monitoring server 4. The metadata is generated by reporting module 21, shown in FIG. 2.

Figure 2:
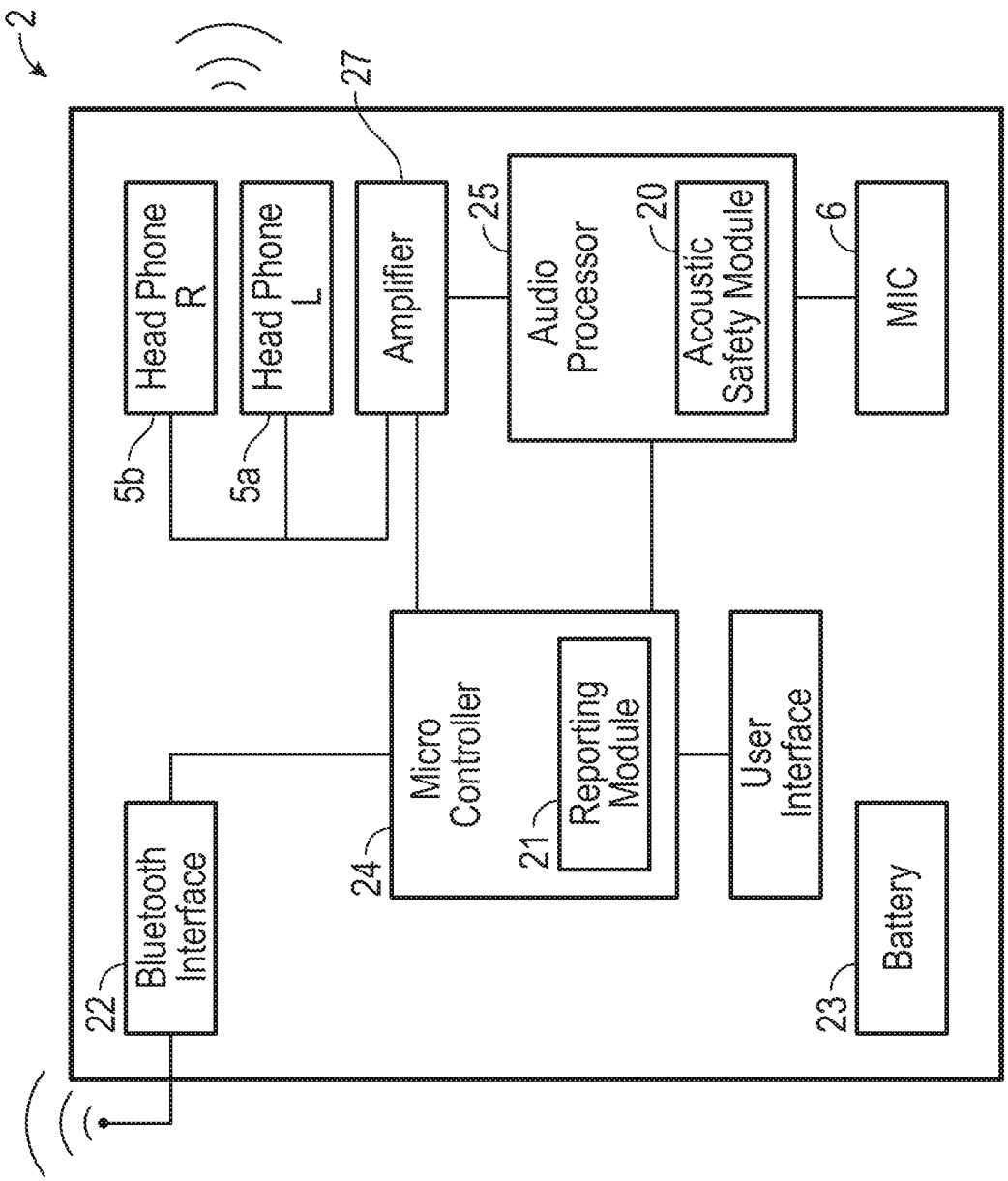
FIG. 2 shows the exemplary headset of the embodiment FIG. 1 in a schematic block diagram.

FIG. 2 shows the embodiment of headset 2 of FIG. 1 in a schematic block diagram. As can be seen from FIG. 2, headset 2 comprises, besides the aforementioned components, microcontroller 24 with reporting module 21, audio processor 25 with acoustic safety module 20, amplifier 27, and a rechargeable battery 23 to provide all components of headset 2 with operating power. According to the present embodiment, microcontroller 24 is a ST Micro ARM Processor. Audio processor 25 is a DSP (digital sound processor, TMS320, available from Texas Instruments) along with a separate ALIC (Acoustic Limiting Integrated Chip—not shown in the FIGS.) and is configured to receive the input audio stream from Bluetooth interface 22 and to convert the digital input audio stream into a corresponding analog audio signal for amplifier 27, which drives the headphones 5a, 5b to provide output audio to the user during use. It is noted that in this example stereo output audio is provided to the user from a digital stereo audio signal.

As discussed in the preceding, audio processor 25 comprises a mode-switchable acoustic safety module 20 to reduce acoustic shocks to the user during operation, i.e., an event that would result in damage to the user's hearing. The acoustic safety module 20 comprises audio limiter algorithms that are configured to limit the sound pressure level (SPL) of the output audio to the following:
  a) Maximum SPL: 102 dB(A) SPL (anti-startle limit according to G616:2006)
  b) Maximum time-weighted average: 90 dB(A) (USA)/87 dB(A) SPL (EU & AU)
  c) Maximum increase in SPL of approx. 25 dB(A)/50 ms (delta limiter)

The above limits are mode-switchable, i.e., can be switched on and off by the user using user interface 13 and by the monitoring server 4, as will be explained in further detail in the following. Limiter algorithm c) is explained in detail in U.S. published patent application US 2006/0147049 A1.

The audio limiter circuit of the ALIC, as discussed in the preceding, provides a high anti-startle limit of 118 dB(A) SPL that is an "always on" limit to avoid serious damage to a user's hearing. The high anti-startle limit cannot be disengaged, even in case acoustic safety module 20 is disabled.

Reporting module 21 of microcontroller 24 generates metadata of the output audio during use, as discussed in the preceding. The metadata in this embodiment is generated continuously or semi-continuously (periodic or asynchronous) during use and comprises the sound pressure level, provided by headphones 5a, 5b. To obtain the metadata, microcontroller 24 and thus reporting module 21 is connected to audio processor 25 and to amplifier 27. The metadata is sent to monitoring server 4 over communication hub 3.

The operation of monitoring server 4 will in the following be explained with reference to the schematic flow diagram of FIGS. 3A and 3B. The operation of monitoring server 4 begins when headset system 1 is initialized upon power-up in step 30. In step 31, the desired mode of operation is determined, either from memory 16 in case the system 1 has been operated before or by querying a system administrator over a server console (not shown) of monitoring server 4. According to the present embodiment, the system 1 can be operated in a "monitoring mode" and an "automatic protection mode". During the initial setup of system 1 or in case of a change in operating mode, the administrator's choice is stored in memory unit 16.

In step 32, the monitoring server 4 determines, whether at least one headset 2 of the headset system 1 is operational, i.e., switched on by its user. If this is not the case, the monitoring server 4 will standby in step 33 and then occasionally check, whether a headset 2 now is operational.

If a headset 2 is operational, the monitoring server 4 begins with a monitoring loop in step 34. In step 35, the monitoring server 4 receives metadata from headset 2. In step 36, the event reporting rules engine (ERRE) 17 of monitoring server 4 determines on the basis of the provided metadata, whether an acoustic safety incident is given. In the present embodiment, ERRE 17 determines the following parameters from observed metadata:

dB SPL levels of the audio signal over time and frequency, and call control events, user interface events, type of acoustic incidences, and other audio related metadata from the headset user.

The ERRE in this example determines three common types of acoustic safety incidences from the above data, namely a) impulse noises present in the output audio (also referred to as "anti-startle detection"), b) extremely loud audio levels, and c) continuous noises present in the output audio for prolonged periods.

The last feature effectively helps limit the audio dosage consumed by the headset user, which is also referred to as "time weighted average detection".

Acoustic safety incidences created by impulse noises (e.g., gun-shot sounds, fire-alarm sounds, clicks, and "pops" because of electrical short circuits, etc.) are also sometimes referred to as 'impact' or 'impulsive' noises. These noises are of very short duration and are determined by a peak detector (not shown) of the ERRE 17. Continuous noises last longer in duration than impulse noises. Continuous noises may extend over a few seconds to few hours and are determined by an averaging detector (not shown) of ERRE 17.

The detector circuits of ERRE 17 determine, whether the aforementioned limits are exceeded, namely:

Maximum SPL: 102 dB(A) SPL (anti-startle limit according to G616:2006)
Maximum time-weighted average: 90 dB(A) (USA)/87 dB(A) SPL (EU & AU)
Maximum increase in SPL of approx. 25 dB(A)/50 ms (delta limiter)

Certainly, the determination of an acoustic safety incident may be conducted by analyzing the metadata, received in current step 35 as well as the metadata, obtained in previous cycles of the monitoring loop. The latter being necessary for "long term" safety incident detection by averaging detector of ERRE 17.

In case an acoustic safety incident is given at headset 2, the monitoring server in step 37 determines the mode of operation selected, as obtained in step 31. If the selected mode corresponds to "automatic protection mode", the monitoring device in step 38 sends a control command to headset 2 to enable the acoustic safety module 20. Then, a corresponding safety notification is provided to the user of headset 2 and the administrator of system 1 in step 39. In addition, the acoustic safety incident is logged together with the date and time of its occurrence in a safety database, stored in memory unit 16 for future reference.

Figure 3A:
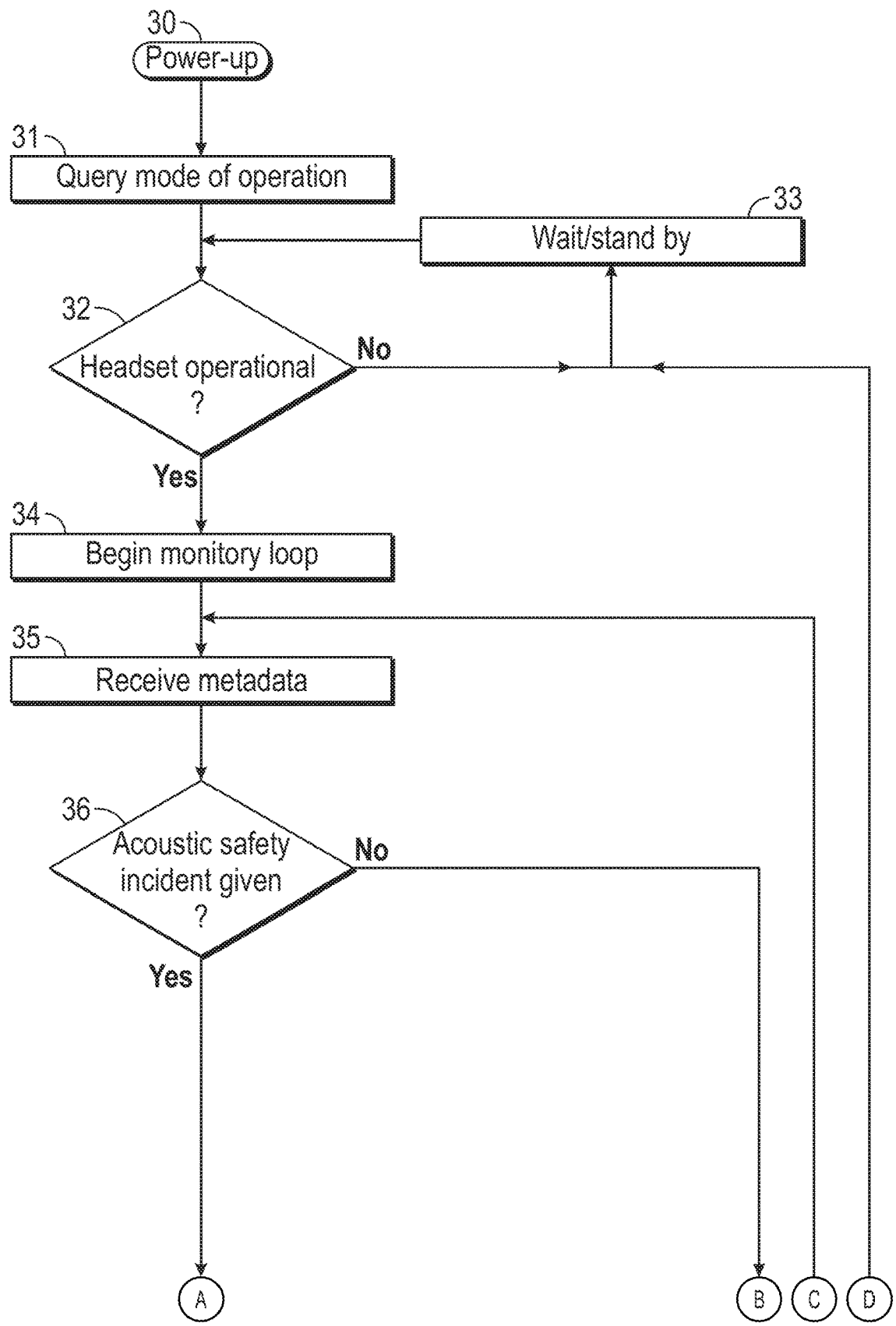
FIGS. 3A and 3B show the operation of the monitoring server of the embodiment of FIG. 1 in a schematic flow diagram.
Figure 3B:
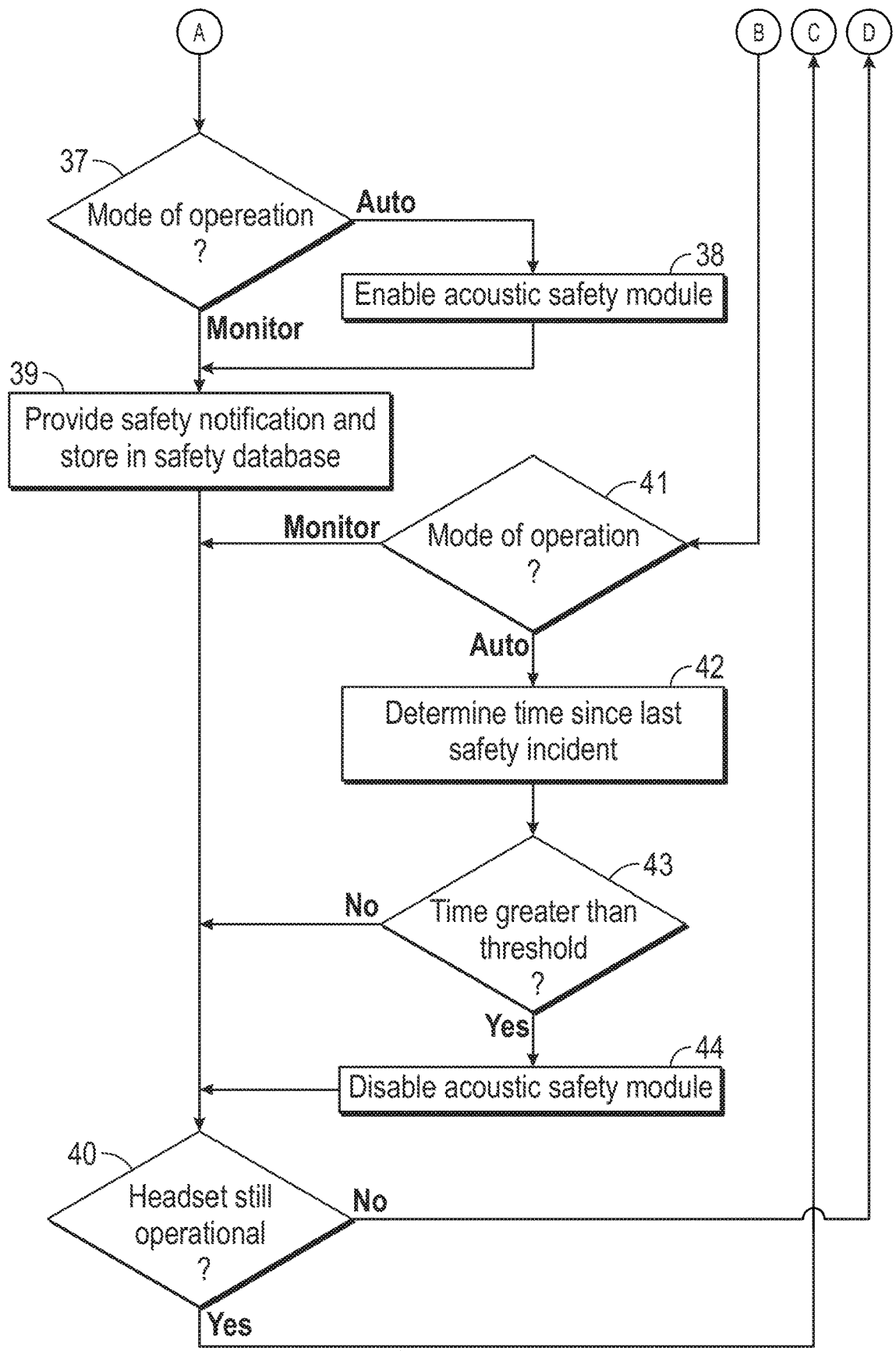

As will become apparent from FIG. 3B and in case the selected mode corresponds to "monitoring mode", the procedure directly moves to step 39 without enabling the acoustic safety module 20, however, still providing the safety notification as discussed. In addition, the incident details are stored in memory unit 16 for future reference and analysis.

In step 40, it is determined, whether the headset is still operational. If this is the case, the procedure is continued with step 35. Otherwise the monitoring server 4 is set to "standby" in step 33, as discussed in the preceding.

If the determination in step 36 provides that no acoustic safety incident is given, and in step 41, the current mode of operation is determined. This corresponds to the operation of step 37 as explained in the preceding. In case the current mode of operation corresponds to the mentioned "monitoring mode", the procedure moves to step 40. In case the current mode of operation corresponds to the "automatic protection mode", the time of the last safety incident is determined in step 42. During this step, ERRE 17 queries the safety database, stored in memory unit 16 to obtain the time and date of the latest acoustic safety incident at the given headset 2. In step 43, it is determined whether the time passed since the last acoustic safety incident is greater than a predefined (user selected or manufacturer defined) timeout threshold. In this embodiment, the timeout threshold is 1 hour cumulative duration of use of headset 2. In case the time passed is greater than the timeout threshold, the monitoring server 4 in step 44 sends a command to headset 2 to disable the acoustic safety module. Otherwise, the procedure proceeds to step 40, as will be apparent from FIG. 3B.

Figure 4:
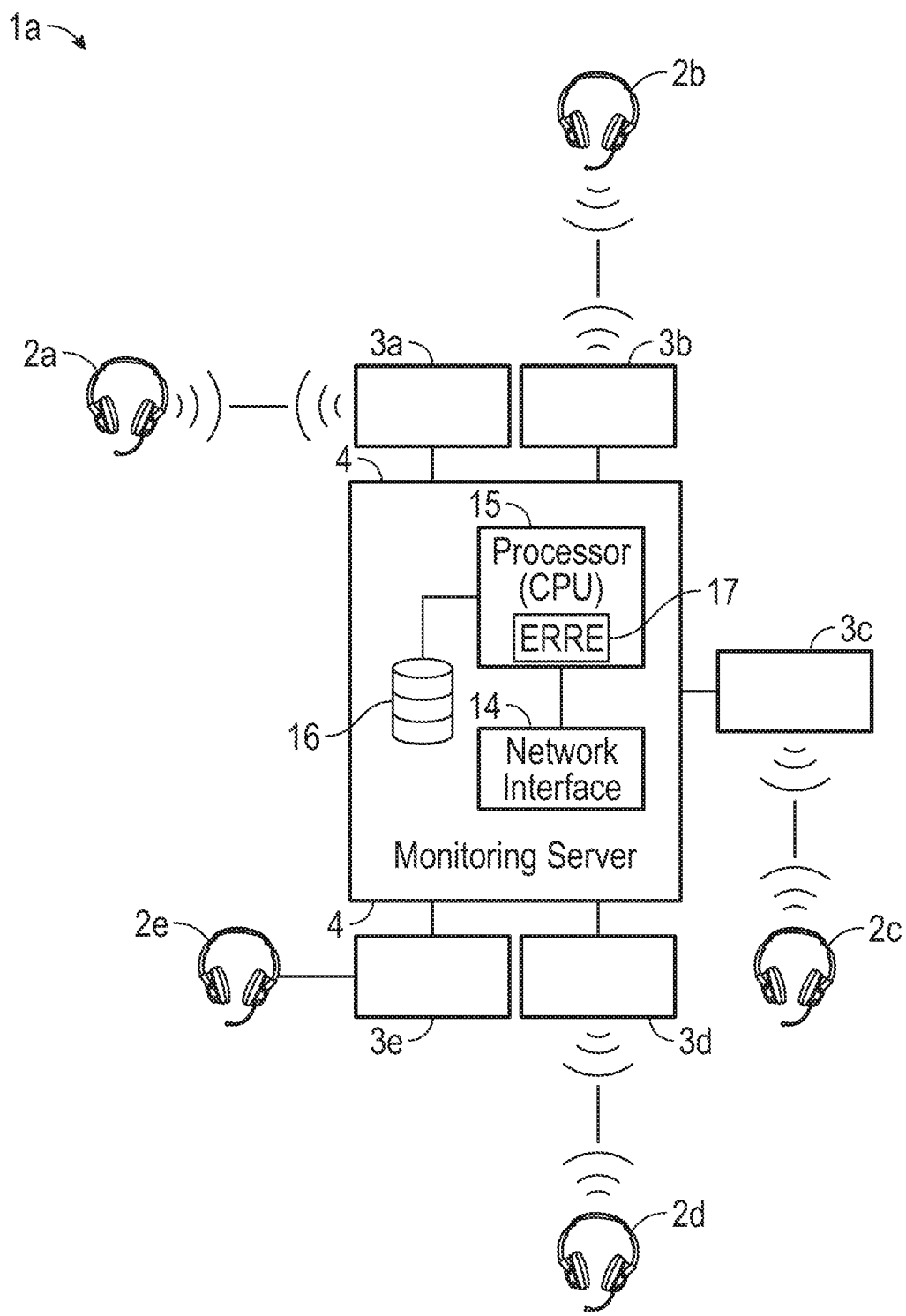
FIG. 4 shows a second embodiment of a headset system in a schematic block diagram.

It should be noted that the above procedure according to FIGS. 3A and 3B may be used in the shown headset system 1, having a single headset 2, however also in headset systems, having a plurality of headsets 2. An embodiment of a headset system 1a of the latter case is shown in FIG. 4 in a schematic block diagram. In addition, the procedure of FIGS. 3A and 3B can also be used in the embodiments of FIGS. 8-11.

According to the embodiment of FIG. 4, headset system 1a comprises multiple headsets 2a-2e, each connected to an associated communication hub 3a-3e. While the setup of headsets 2a-2d and communication hubs 3a-3d correspond to the setup discussed in the preceding with reference to FIG. 1, headset 2e is connected over a cable connection with communication hub 3e. Accordingly, the headset 2e and communication hub 3e do not comprise the aforementioned Bluetooth interfaces 8, 22. The remaining components correspond again to the setup as discussed with reference to FIG. 1.

The operation of headset system 1a and in particular of headsets 2a-2e as well as monitoring server 4 according to the embodiment of FIG. 4 corresponds to the preceding discussion of the flow diagram of FIGS. 3A and 3B. Obviously, all headsets 2a-2e now provide metadata of the output audio in step 35 to monitoring server 4 and the event reporting rules engine 17.

With respect to the enabling of the acoustic safety module 20 in step 38 and the disabling in step 44, two configurations are provided in the current embodiment. The configuration again can be set by the system's administrator, e.g., during the initial setup of system 1a.

In a first, device-based configuration, only the acoustic safety module 20 of the respective headset 2a-2e is enabled in step 38, at which headset the acoustic safety incident was determined to be given in step 36. Similarly, in this mode, the acoustic safety module 20 of each headset 2a-2e is only disabled in step 44 when the timeout threshold is exceeded for the respective headset 2a-2e. To allow this functionality, the safety notification stored in safety database in step 39 comprises a device identifier/product ID that allows to determine the headset 2a-2e, at which the acoustic safety incident occurred.

According to a second, group-based configuration, the acoustic safety modules 20 of all headsets 2a-2e are enabled in case an acoustic safety incident is given at one of the headsets 2a-2e. Correspondingly, the acoustic safety modules 20 of headsets 2a-2e are disabled in step 44, when the time since the last acoustic safety incident occurred is greater than the overall timeout threshold.

Figure 5:
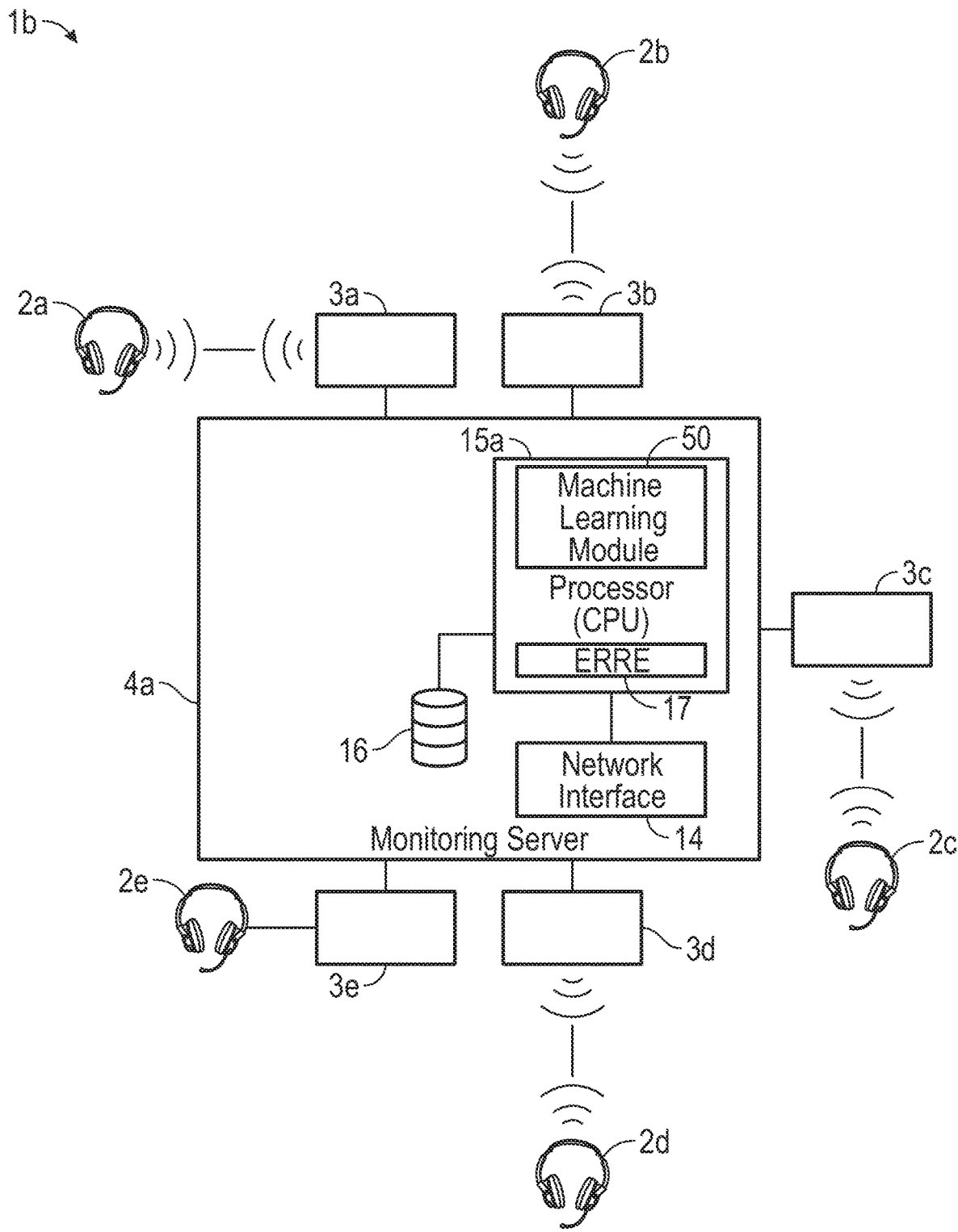
FIG. 5 shows a further embodiment of a headset system in a schematic block diagram.

FIG. 5 shows a further embodiment of a headset system 1b in a schematic block diagram. The headset system 1b according to the present embodiment corresponds to headset system 1a, with the exception of the setup of monitoring server 4a. In the present embodiment, processor 15a of monitoring server 4a in addition to ERRE 17, comprises a machine learning module 50. The machine learning module 50 provides an acoustic safety probability parameter from the metadata of the output audio.

The machine learning module 50 uses the metadata to provide the acoustic safety probability parameter, which in this embodiment is a percentage likelihood that an acoustic safety incident will be given in the near future.

Figure 6A:
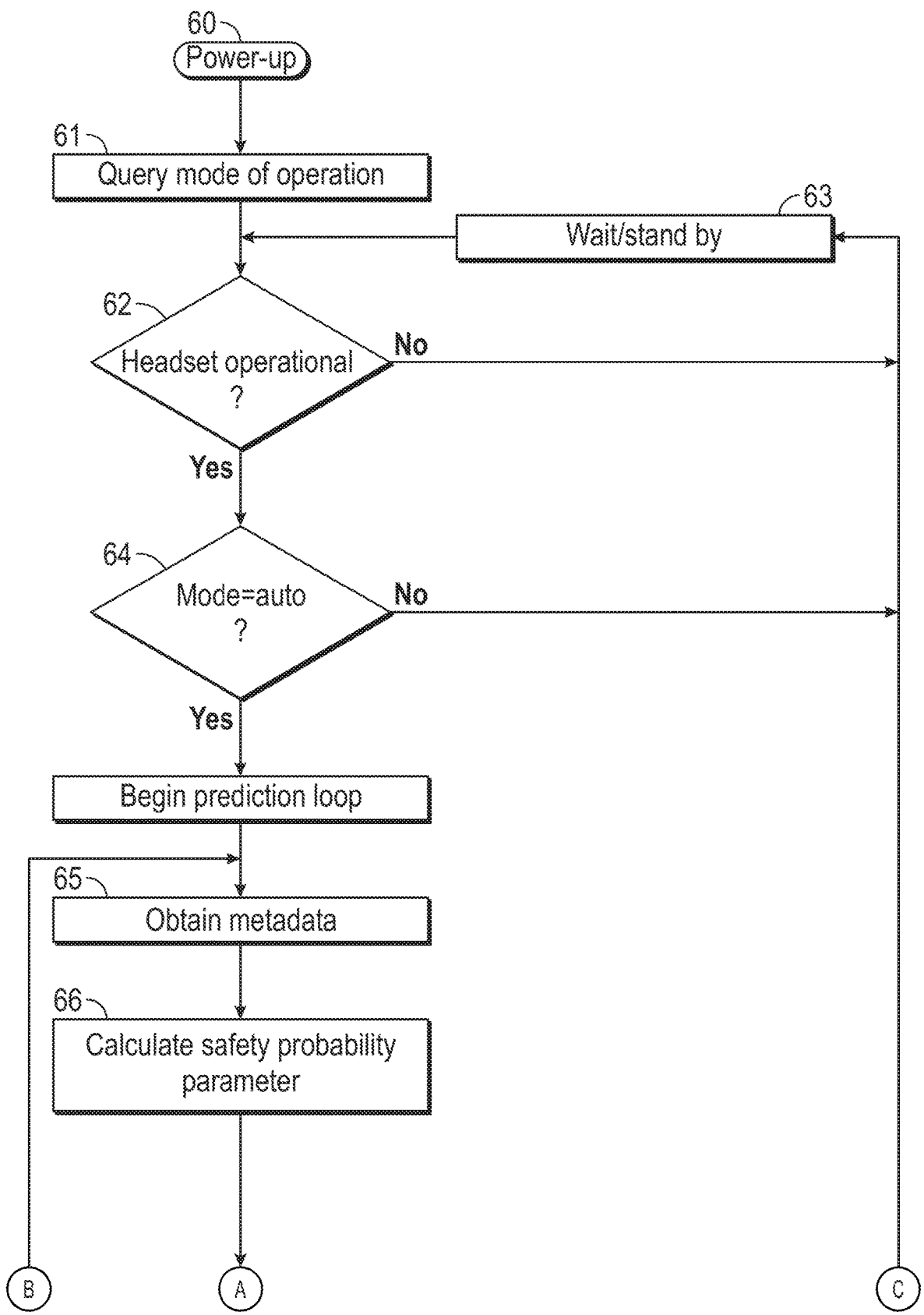
FIGS. 6A and 6B show an exemplary flow diagram of the operation of a machine learning module of the embodiment of FIG. 5.
Figure 6B:
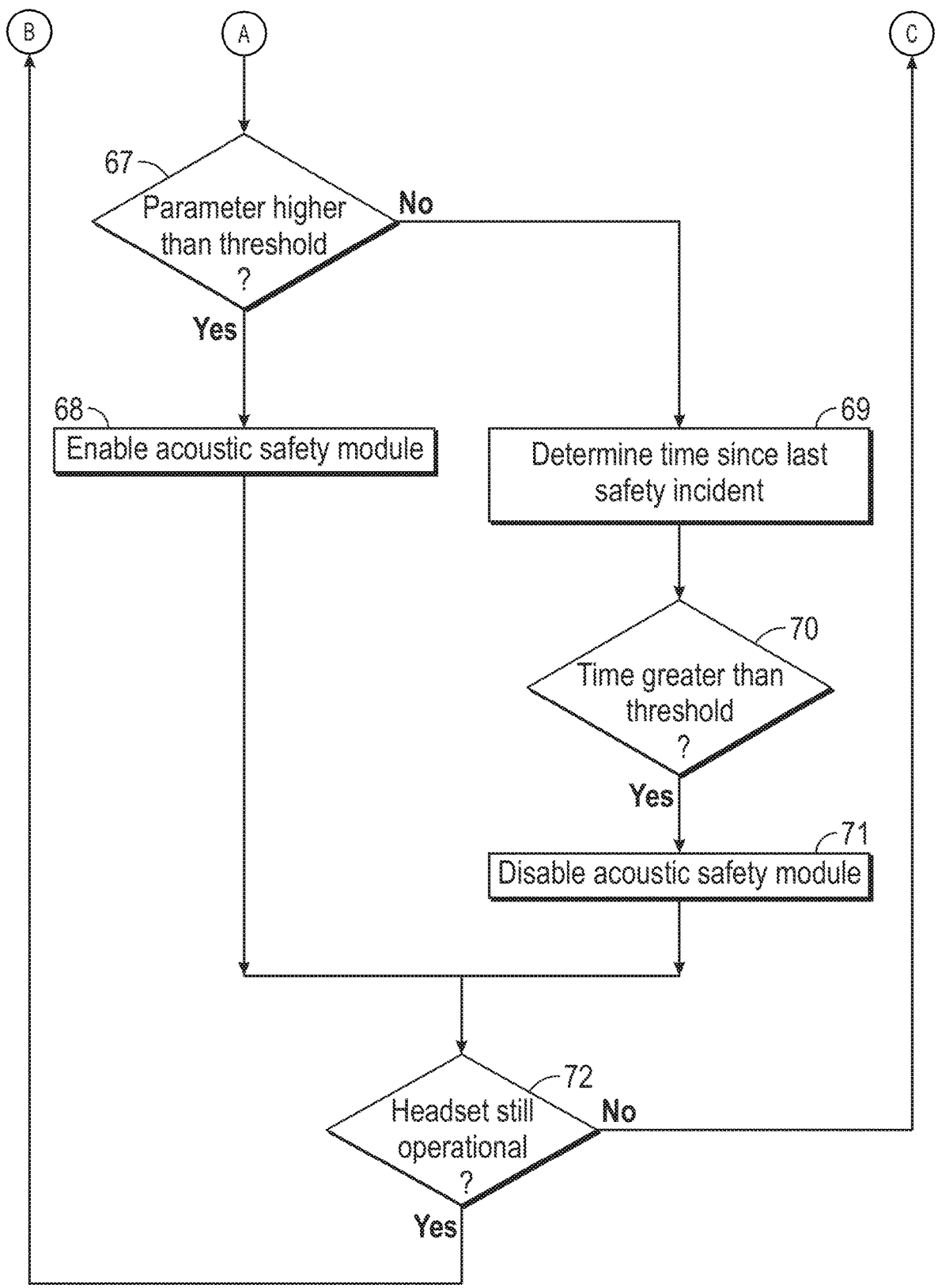

A flow diagram of the operation of machine learning module 50 is shown in FIGS. 6A and 6B. It is noted that the operation of machine learning module 50 in this embodiment is conducted in parallel to the operation of events reporting rules engine 17, discussed with reference to FIGS. 3A and 3B.

Corresponding to the preceding discussion of FIGS. 3A and 3B, operation of the machine learning module 50 begins upon power-up in step 60. Here, the system administrator may set a safety incident probability threshold, which in this example is set to 75%.

In step 61, the mode of operation is queried, i.e., "monitoring" or "automatic protection mode". In step 62, the machine learning module 50 queries, whether one of the headsets 2a-2e is in an operational state. If this is not the case, the machine learning module 50 remains in standby in step 63 and repeats the query periodically.

In step 64, the machine learning module 50 determines, whether the selected mode of operation corresponds to the discussed "automatic protection mode". If this is the case, the prediction loop starts in step 64. Then, the metadata, i.e., the metadata of the output audio from headsets 2a-2e is obtained in step 65. The safety probability parameter is calculated in step 66.

It is noted that machine learning module 50 comprises an artificial neural network and uses the metadata as training data, together with current date and time, as well as the safety notifications of the safety database. Typical artificial neural networks use the training data to allow the determination of repeating patterns, which in turn allows to calculate the probability of whether an acoustic safety incident occurs during a—typically short—prediction horizon. The machine learning module 50 thus is used to predict future acoustic safety incidents based on the past occurrences of acoustic safety incidents, i.e., on the basis of metadata obtained from one or more headsets 2a-2e.

The machine learning module 50 uses industry standard data analysis techniques to arrive at the acoustic safety probability parameter, namely one or more of clustering (spectral, modular), linear and non-linear regression analysis, predictive analysis, prediction and regression analysis using neural networks, principal component analysis (PCA), Eigen vector analysis, and classification and hypothesis.

Machine learning module 50 employs the following factors as inputs: intensity/level of acoustic incidents, frequency of acoustic incidents, grouping of acoustic incidents, and patterns around acoustic incidents from the one or more headsets 2a-2e.

In step 67, the calculated acoustic safety probability parameter is compared with the safety incident probability threshold. If the threshold is met or exceeded, the acoustic safety modules 20 of headsets 2a-2e are enabled in step 68. Corresponding to the discussion of the embodiment of FIG. 4, the enabling of the acoustic safety module 20 may be "device-based" or "group-based".

If the threshold is not met, the machine learning module 50 in step 69 determines the time passed since the last safety incident and in step 70, whether the time passed is greater than a timeout threshold. The operation of steps 69 and 70 correspond to the operation of the events reporting rules engine 17 in steps 42 and 43 according to the embodiment of FIGS. 3A and 3B. Accordingly, only in case that the probability parameter is lower than the threshold and in case that during the past time, no acoustic safety incident occurred, the acoustic safety module is disabled in step 71. The operation then proceeds with step 72 and a further determination, whether at least one of the headsets 2a-2e is in an operational state. It is noted that the operation according to the present embodiment may also be applied to the embodiments of FIGS. 8-11.

Figure 7:
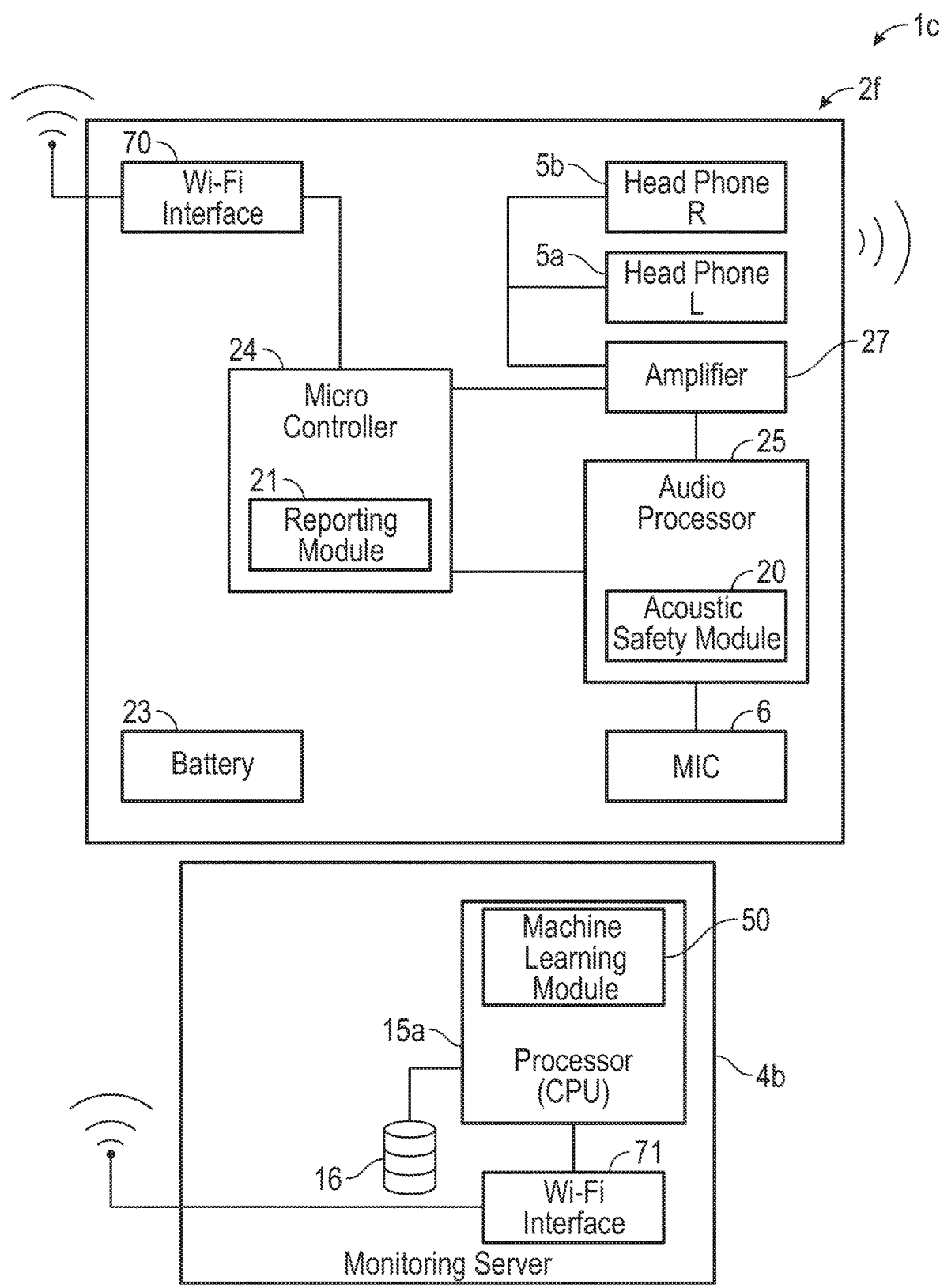
FIG. 7 shows a further embodiment of a headset system.

FIG. 7 shows a further embodiment of a headset system 1c. The headset system 1c corresponds to the embodiment, discussed in the preceding with reference to FIG. 5, with the following exceptions. Although only one headset 2f is shown, it is noted that headset system 1c certainly may have more than one headset 2f.

According to the present embodiment, headset 2f and monitoring server 4b comprise Wi-Fi interfaces 70, 71, instead of the Bluetooth interface 22 and network interface 14, discussed in the preceding. The Wi-Fi interfaces 70, 71 allow direct communication between headset 2f and monitoring server 4b, without an intermediate communication hub.

Monitoring server 4b comprises the discussed machine learning module 50, but in this embodiment, does not comprise the discussed events reporting rules engine, so that monitoring server 4b relies on the predictive determination of the likelihood of acoustic safety incidents, as discussed in the preceding with reference to FIGS. 6A and 6B.

Figure 8:
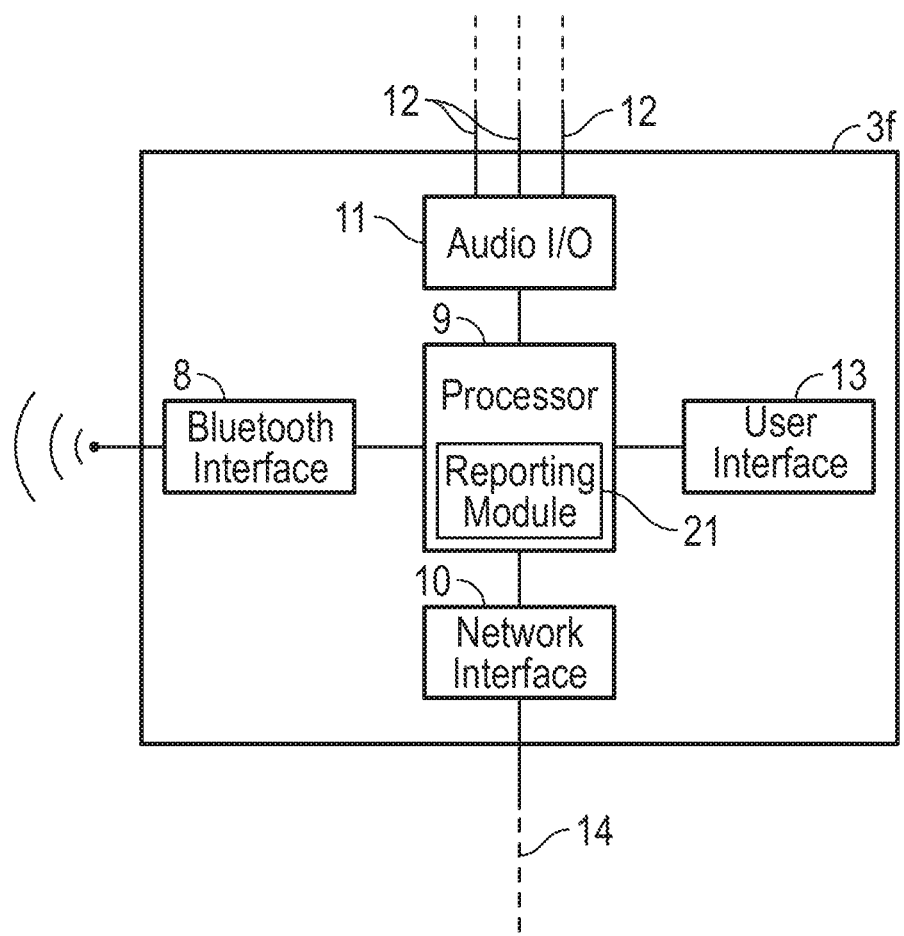
FIG. 8 shows a further embodiment of a communication hub.

FIG. 8 shows a further embodiment of a communication hub 3f for use in a headset or communication system. The communication hub 3f corresponds to the communication hub 3 of the embodiment of FIG. 1, with the exception of processor 9. As will be apparent from FIG. 8, processor 9 in this embodiment comprises the aforementioned reporting module 21. The functionality of the reporting module 21 corresponds to the functionality, discussed in the preceding with reference to FIGS. 1-7. In addition, the processor 9 comprises an audio limiter circuit that provides a high anti-startle limit of 118 dB(A) SPL. The audio limiter circuit is an "always on" limit to avoid serious damage to a user's hearing. The high anti-startle limit cannot be disengaged, as discussed in the preceding.

The present embodiment enables use of the communication hub 3f together with a headset or another user audio device, such as a speaker, that does not have an internal reporting module 21. Certainly, communication hub 3f may be used in an embodiment together with a headset that has its own reporting module 21, such as the headset 2 of FIGS. 1 and 2.

Figure 9:
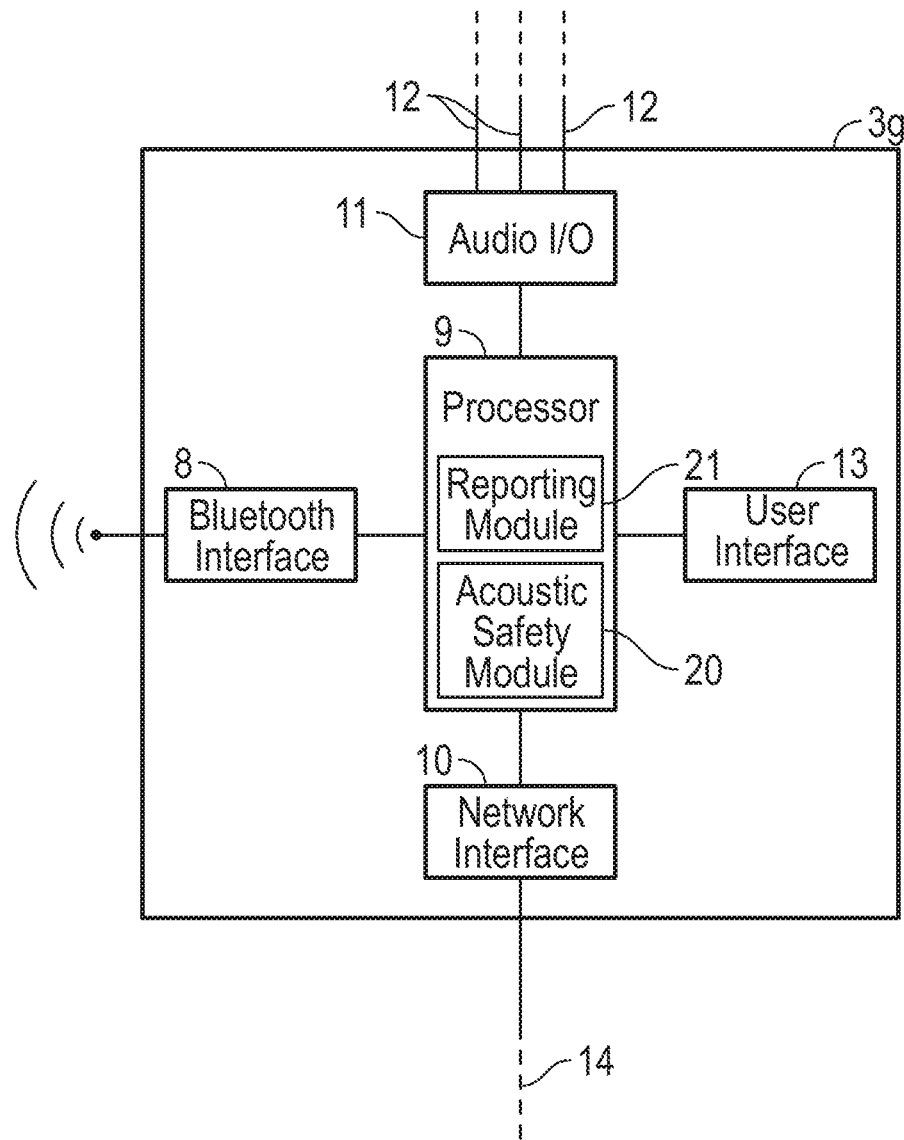
FIG. 9 shows another embodiment of a communication hub.

FIG. 9 shows another embodiment of a communication hub 3g, for use in a headset or communication system. The communication hub 3g of this embodiment corresponds to the embodiment of FIG. 8, with the exception that processor 9 herein also comprises the acoustic safety module 20, which functionality corresponds to the preceding discussion of the embodiments of FIGS. 1-7.

The present embodiment enables use of the communication hub 3g with a headset or another user audio device, such as a speaker, that does not have an internal acoustic safety module 20. Certainly, communication hub 3g may be used in an embodiment together with a headset that has its own acoustic safety module 20, such as the headset 2 of FIGS. 1 and 2.

Figure 10:
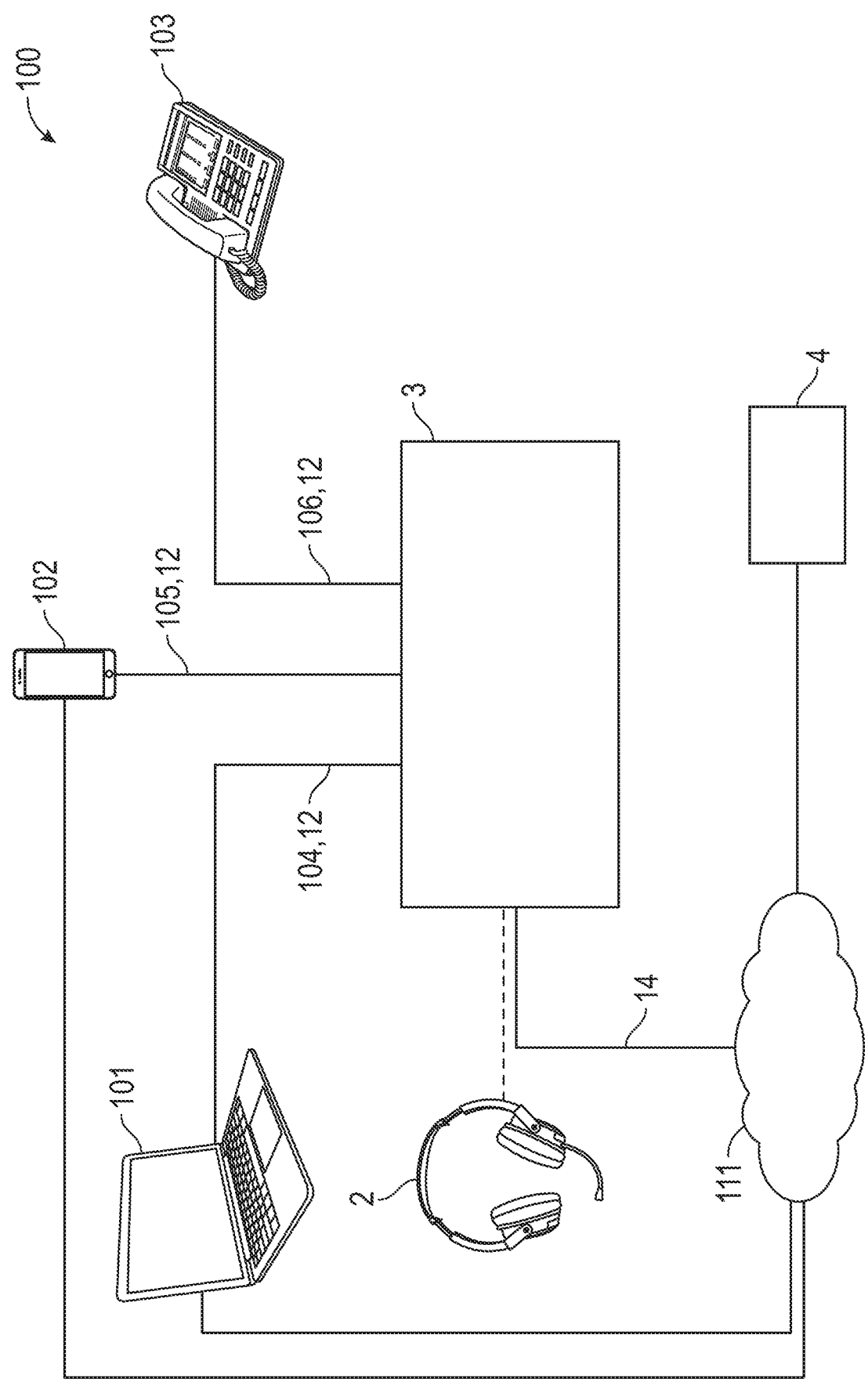
FIG. 10 shows an embodiment of a communication system with multiple audio sources.

FIG. 10 shows an embodiment of a communication system 100, having multiple audio sources 101, 102, and 103, connected with hub 3 over the corresponding audio connections 12. Headset 2 and hub 3 in FIG. 10 may correspond to any of the embodiments, discussed in the preceding.

As shown in FIG. 10, a laptop computer 101 with a VOIP application is connected with headset hub 3 over a USB connection 104. Additionally, a smart phone 102, and a desk (PSTN) phone 103 are connected with headset hub 3. Smart phone 102 is connected with hub 3 using a Bluetooth connection 105, while desk phone 103 is connected using a provided headset/handset socket of desk phone 103 and a corresponding analog audio connection 106. As will be apparent, audio is transmitted over USB connection 104, wireless Bluetooth connection 105, and analog audio connection 106, which thus simultaneously serve as audio connections 12.

The user of hub 3 is able to select the desired audio source using user interface 13, as discussed in the preceding. The connection 14 to monitoring server 4 is a network connection, e.g., a TCP/IP Internet connection using network interface 10 (not shown in FIG. 10) over the Internet 111.

Figure 11:
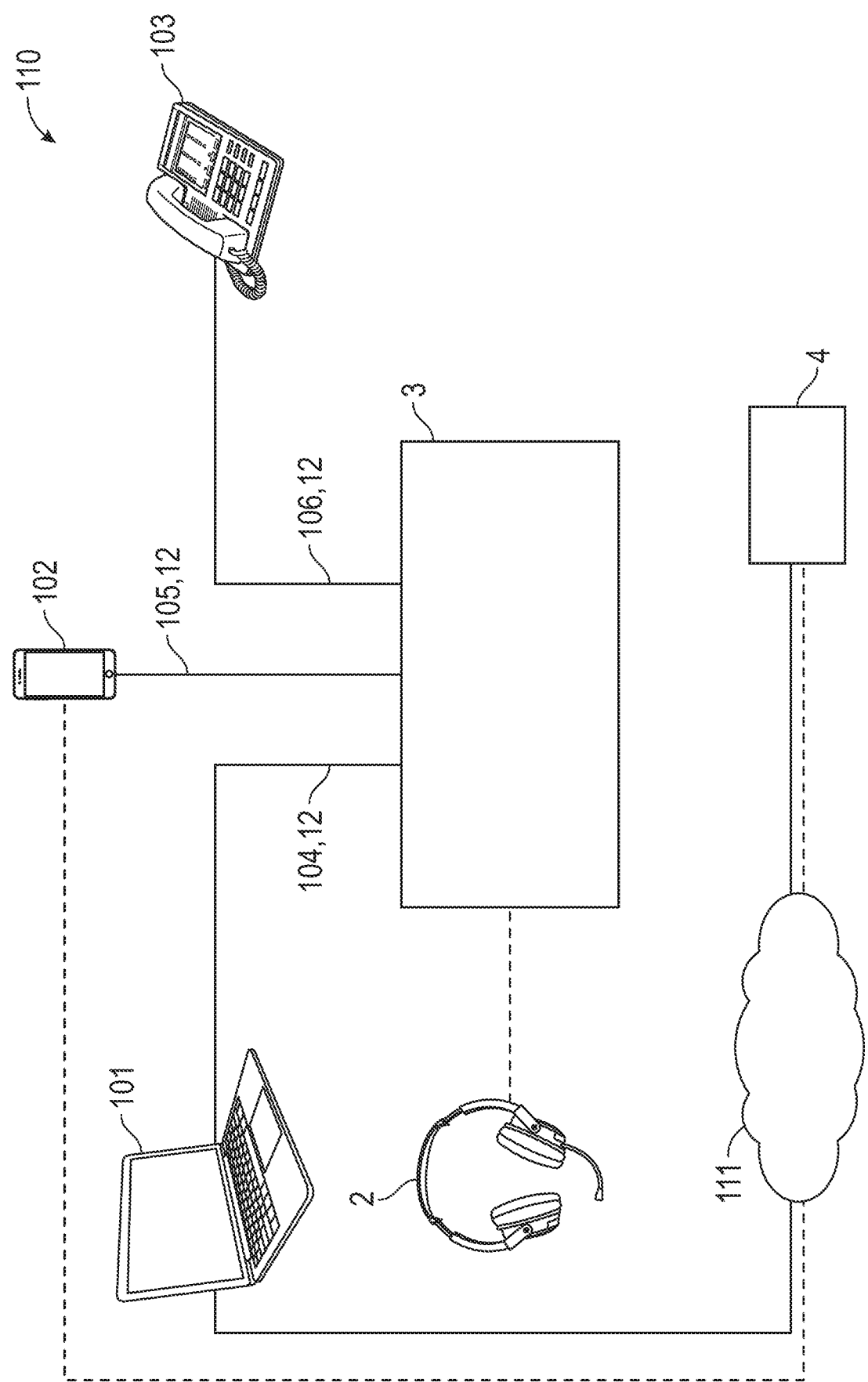
FIG. 11 shows another embodiment of a communication system with multiple audio sources.

FIG. 11 shows another embodiment of a communication system 110. The present embodiment corresponds to the embodiment of FIG. 10 with the exception of the connection to monitoring server 4. Instead of the hub 3 comprising a network interface, a connection to monitoring server 4 is established in this embodiment over laptop computer 101, i.e., the already established USB connection 104. The laptop computer 101 is connected to the Internet 111 and thus indirectly establishes a connection between the hub 3 and the monitoring server 4 to, e.g., transmit the collected metadata.

Alternative to a connection over laptop computer 101, the smart phone 102 could establish a connection between hub 3 and monitoring server 4, as indicated by the dashed line. Also here, the hub 3 would use the existing Internet connection of the smart phone 102. The communication between smart phone 102 and hub 3 is conducted over Bluetooth connection 105, as discussed in the preceding. In both examples, the laptop computer 101 and the smart phone 102 thus act as "intermediate device" to facilitate communication between hub 3 and monitoring server 4. This may be particularly useful in applications, where hub 3 has no direct LAN connection or no network interface.

While the invention has been illustrated and described in detail in the drawings and foregoing description, such illustration and description are to be considered illustrative or exemplary and not restrictive; the invention is not limited to the disclosed embodiments. For example, it is possible to operate the invention in any of the preceding embodiments, wherein instead of LAN connection 14, the connection between communication hub 3 and monitoring server 4, 4a, 4b is a direct WAN connection, e.g., a wired (e.g., T1, E1, DSL, Cable) or wireless (e.g., 4G or LTE) connection, LAN connection 14 is an indirect connection over an intermediate device, such as a computer, laptop, or smart phone, where the hub 3 uses the corresponding data connection of the intermediate device, instead of the reporting module 21 being integrated with headset 2, the reporting module being integrated with headset hub/communication hub 3, the communication hub 3 being formed integrally with a computing device, such as a laptop or desktop computer or a mobile phone, processor 9 provides the functionality of a softphone client, which is connected with the audio I/O interface 11 to at least provide an input audio signal, the monitoring server 4, 4a, 4b is a cloud-based server, the steps of enabling and disabling the acoustic safety module are selective, i.e., one or more of the discussed maximum SPL limiter, anti-startle level limiter, duration limiter, and delta limiter are enabled or disabled in dependence of the type of acoustic safety incident, the headset 2, 2a-2e instead of being connected with communication hub 3, 3a-3g over a Bluetooth connection, being connected using a DECT connection and consequently, user device interface 8 and headset interface 22 are additionally or alternatively configured for DECT communication, referring to the embodiment of FIG. 7, instead of or in addition to Wi-Fi interfaces 70, 71, cellular communication interfaces are used, referring to the embodiments of FIGS. 10 and 11, instead of USB connection 104, a Bluetooth or Wi-Fi connection is used as audio connection to laptop 101, referring to the embodiments of FIGS. 10 and 11, instead of Bluetooth connection 105, a USB or Wi-Fi connection is used as audio connection to smart phone 102, referring to the embodiments of FIGS. 10 and 11, instead of analog audio connection 106, a USB or Bluetooth connection is used as audio connection to desk phone 103, and/or referring to the embodiment of FIG. 11, instead of the metadata being transmitted over USB connection 104 or Bluetooth connection 105, data is carried over an alternate communication link to the monitoring server 4 via internet 111.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit may fulfill the functions of several items recited in the claims.

The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A communication hub for a communication system, with at least
    an audio I/O interface for connection with one or more audio sources to at least receive an input audio signal;
    a user device interface for connection with at least one user audio device; a processor to provide a user input audio signal to the user device interface from the input audio signal;
    a reporting module, configured to generate metadata of at least the input audio signal and to provide the metadata to a monitoring device of the communication system; and
    a mode-switchable acoustic safety module with at least an enabled state and a disabled state, which mode-switchable acoustic safety module in the enabled state being configured to process the input audio signal to reduce acoustic shocks.

2. The communication hub of claim 1, wherein the one or more audio sources comprise one or more of the group of a phone, a PSTN phone, a PSTN line, a VOW interface, a computer, and a mobile phone.

3. The communication hub of claim 1, wherein the user device interface is configured for wireless communication with at least one user audio device.

4. The communication hub of claim 1, wherein the user device interface is configured for connection to a headset.

5. The communication hub of claim 1, wherein the audio I/O interface is configured for connection with a plurality of audio sources.

6. The communication hub of claim 1, wherein the processor is configured to receive a user output audio signal from the user device interface and to provide a corresponding output audio signal to the audio I/O interface, wherein the reporting module is configured to generate metadata of the input audio signal and the output audio signal.

7. A communication system, with at least one or more communication hubs; and
    a monitoring device, connected with the one or more communication hubs; wherein each communication hub comprises
    an audio I/O interface for connection with one or more audio sources to at least receive an input audio signal;

a user device interface for connection with at least one user audio device;

a processor to provide a user input audio signal to the user device interface from the input audio signal;

a reporting module, configured to generate metadata of at least the input audio signal and to provide the metadata to the monitoring device; and a mode-switchable acoustic safety module with at least an enabled state and a disabled state, which mode-switchable acoustic safety module in the enabled state being configured to process the input audio signal to reduce acoustic shocks.

8. The communication system of claim 7, wherein the monitoring device is configured to provide a safety notification in case an acoustic safety incident is determined.

9. The communication system of claim 7, wherein the monitoring device is configured to enable to the mode-switchable acoustic safety module of at least one of the one or more communication hubs in case an acoustic safety incident is determined.

10. The communication system of claim 7, further comprising one or more headsets, each being connected with the user device interface of at least one of the one or more communication hubs.

11. The communication system of claim 7, wherein the monitoring device is configured to disable the acoustic safety module in case no acoustic safety incident is determined for a predefined time period.

12. The communication system of claim 7, wherein the reporting module is configured to generate metadata when the mode-switchable acoustic safety module is enabled and when the mode-switchable acoustic safety module is disabled.

13. A method of processing audio with a communication hub of a communication system, wherein at least one input audio signal is received;

the input audio signal is processed to provide a user input audio signal to a user device from the input audio signal;

metadata of the at least one input audio signal is generated;

the metadata is transmitted to a monitoring device of the communication system; and based on the metadata, a mode-switchable acoustic safety module is set to an enabled state or a disabled state, wherein the mode-switchable acoustic safety module in the enabled state being configured to process the input audio signal to reduce acoustic shocks.

14. A monitoring device for use in a communication system with one or more of a communication hub and a headset; wherein the monitoring device is configured to receive metadata from at least one of the communication hub and the headset and to enable a mode-switchable acoustic safety module of at least one of the communication hub and the headset in case an acoustic safety incident is determined.

15. The monitoring device of claim 14, wherein the monitoring device is configured to disable the acoustic safety module in case no acoustic safety incident is determined for a predefined time period.

16. The monitoring device of claim 14, wherein the monitoring device is configured to determine, whether an acoustic safety incident is given by comparing the received metadata with at least one predefined audio safety threshold.

17. The monitoring device of claim 14, wherein the monitoring device is configured to enable a mode-switchable acoustic safety module of a first communication hub or of a first headset based on metadata, received from the first communication hub or the first headset.

18. The monitoring device of claim 14, configured for use in a communication system with a plurality of communication hubs and/or headsets.

19. The monitoring device of claim 18, wherein the monitoring device is configured for group-based enabling of mode-switchable acoustic safety modules of the plurality of communication hubs and/or headsets based upon metadata, received from a first communication hub or a first headset of the plurality of communication hubs and/or headsets.

20. The monitoring device of claim 14, further comprising a machine learning module, configured to receive the metadata from at least one of the communication hub and the headset to determine an acoustic safety probability parameter and to enable the mode-switchable acoustic safety module of at least one of the communication hub and the headset in case the acoustic safety probability parameter corresponds to a safety incident probability threshold.

* * * * *